(12) United States Patent
Johnson et al.

(10) Patent No.: US 8,173,698 B2
(45) Date of Patent: May 8, 2012

(54) ENVIRONMENTAL SENSITIVE FLUOROGENIC COMPOUNDS AND THEIR APPLICATION FOR SINGLET OXYGEN AND PROTEIN DETECTION

(75) Inventors: Iain Johnson, Eugene, OR (US); Jixiang Liu, Eugene, OR (US); Brian Patch, Eugene, OR (US); Wai-Yee Leung, San Ramon, CA (US)

(73) Assignee: Life Technologies Corporation, Carlsbad, CA (US)

( * ) Notice: Subject to any disclaimer, the term of this patent is extended or adjusted under 35 U.S.C. 154(b) by 460 days.

(21) Appl. No.: 12/040,850

(22) Filed: Feb. 29, 2008

(65) Prior Publication Data

US 2008/0160627 A1 Jul. 3, 2008

Related U.S. Application Data

(63) Continuation of application No. 10/993,908, filed on Nov. 19, 2004, now abandoned.

(60) Provisional application No. 60/523,749, filed on Nov. 19, 2003.

(51) Int. Cl.
*A61K 31/352* (2006.01)
*C07D 311/82* (2006.01)

(52) U.S. Cl. .................... 514/454; 549/391; 436/800

(58) Field of Classification Search ............... 514/454, 514/452; 549/391, 358; 436/800
See application file for complete search history.

(56) References Cited

U.S. PATENT DOCUMENTS

| | | | |
|---|---|---|---|
| 3,274,181 A | 9/1966 | Foote et al. |
| 3,281,415 A | 10/1966 | Schneider et al. |
| 4,603,209 A | 7/1986 | Tsien et al. |
| 4,711,955 A | 12/1987 | Ward et al. |
| 4,774,339 A | 9/1988 | Haugland et al. |
| 4,810,636 A | 3/1989 | Corey et al. |
| 4,812,409 A | 3/1989 | Babb et al. |
| 4,849,362 A | 7/1989 | Demarinis et al. |
| 4,945,171 A | 7/1990 | Haugland et al. |
| 4,997,928 A | 3/1991 | Hobbs |
| 5,047,519 A | 9/1991 | Hobbs et al. |
| 5,049,673 A | 9/1991 | Tsien et al. |
| 5,171,534 A | 12/1992 | Smith et al. |
| 5,187,288 A | 2/1993 | Kang et al. |
| 5,227,487 A | 7/1993 | Haugland et al. |
| 5,242,805 A | 9/1993 | Naleway et al. |
| 5,248,782 A | 9/1993 | Haugland et al. |
| 5,268,486 A | 12/1993 | Waggoner et al. |
| 5,274,113 A | 12/1993 | Kang et al. |
| 5,332,666 A | 7/1994 | Prober |
| 5,352,803 A | 10/1994 | Mattingly |
| 5,362,628 A | 11/1994 | Haugland et al. |
| 5,405,975 A | 4/1995 | Kuhn et al. |
| 5,433,896 A | 7/1995 | Kang et al. |
| 5,442,045 A | 8/1995 | Haugland et al. |
| 5,451,343 A | 9/1995 | Neckers et al. |
| 5,453,517 A | 9/1995 | Kuhn et al. |
| 5,459,276 A | 10/1995 | Kuhn et al. |
| 5,486,616 A | 1/1996 | Waggoner et al. |
| 5,501,980 A | 3/1996 | Katerinopoulos et al. |
| 5,525,088 A | 6/1996 | Mayne |
| 5,569,587 A | 10/1996 | Waggoner |
| 5,569,766 A | 10/1996 | Waggoner et al. |
| 5,573,904 A | 11/1996 | Mattingly |
| 5,627,027 A | 5/1997 | Waggoner |
| 5,648,270 A | 7/1997 | Kuhn et al. |
| 5,696,157 A | 12/1997 | Wang et al. |
| 5,714,327 A | 2/1998 | Houthoff et al. |
| 5,798,276 A | 8/1998 | Haugland et al. |
| 5,830,912 A | 11/1998 | Gee et al. |
| 5,846,737 A | 12/1998 | Kang |
| 5,847,162 A | 12/1998 | Lee et al. |
| 6,008,379 A | 12/1999 | Benson et al. |
| 6,017,712 A | 1/2000 | Lee et al. |
| 6,048,982 A | 4/2000 | Waggoner et al. |
| 6,080,852 A | 6/2000 | Lee et al. |
| 6,111,116 A | 8/2000 | Benson et al. |
| 6,130,101 A | 10/2000 | Mao et al. |
| 6,162,931 A | 12/2000 | Gee et al. |
| 6,184,379 B1 | 2/2001 | Josel et al. |
| 6,221,606 B1 | 4/2001 | Benson et al. |
| 6,229,055 B1 | 5/2001 | Klaubert et al. |
| 6,339,392 B1 | 1/2002 | Ashihara et al. |
| 6,348,599 B1 | 2/2002 | Cummins et al. |
| 6,358,684 B1 | 3/2002 | Lee |
| 6,403,807 B1 | 6/2002 | Singh et al. |
| 6,459,276 B1 | 10/2002 | Matthews |
| 6,525,088 B1 * | 2/2003 | Nagano et al. ............... 514/452 |
| 6,664,047 B1 | 12/2003 | Haugland et al. |
| 6,716,979 B2 | 4/2004 | Diwu et al. |
| 6,974,873 B2 | 12/2005 | Leung et al. |
| 6,977,305 B2 | 12/2005 | Leung et al. |
| 7,169,922 B2 | 1/2007 | Diwu et al. |
| 7,226,740 B2 | 6/2007 | Haugland et al. |

FOREIGN PATENT DOCUMENTS

WO WO-94/05688 3/1994

OTHER PUBLICATIONS

U.S. Appl. No. 10/993,908, "Non-final Office Action mailed", Aug. 30, 2007.
U.S. Appl. No. 10/993,908, "Response to Restriction Requirement filed", Jul. 25, 2007.
U.S. Appl. No. 10/993,908, "Restriction Requirement mailed", Jul. 25, 2007.
Aubry, Jean-Marie, et al., "Chemical Sources of Singlet Oxygen. 3. Peroxidation of Water-Soluble Singlet Oxygen Carriers with the Hydrogen Peroxide—Molybdate System.", *Journal of Organic Chemistry*, vol. 54 1989, 726-728.
Berge, Stephen M., et al., "Pharmaceutical Salts", *Journal of Pharmaceutical Science* vol. 66 1977, 1-19.
Bouizar, Zhor, et al., "Purification and Characterization of Calcitonin Receptors in Rat Kidney Membranes by Covalent Cross-Linking Techniques.", *Eur. J. Biochem*, vol. 155, No. 1 1986, 141-147.
Brinkley, "A Brief Survey of Methods for Preparing Protein Conjugates with Dyes, Haptens, and Cross-Linking Reagents", *Bioconjugate Chemistry* vol. 3, Issue 1, Jan.-Feb. 1992, 2-13.

(Continued)

*Primary Examiner* — Charanjit S Aulakh

(57) ABSTRACT

The present invention provides fluorogenic probes and corresponding fluorescent compounds, methods of using the probes, compounds and kits that include the probes.

15 Claims, 5 Drawing Sheets

OTHER PUBLICATIONS

Browning, et al., "Studies on the Differing Effects of the Tumor Necrosis Factor and Lymphotoxin on the Growth of Several Human Tumor Lines", *Journal of Immunology* vol. 143, Issue 6 1989, 1859-1867.

Chandross, E. A., "A New Chemiluminescent System", *Tetrahedron Letters* 12 1963, 761-765.

Corey, J. E., et al., "A Study of the Peroxidation of Organic Compounds by Externally Generated Singlet Oxygen Molecules", *Journal of the American Chemical Society* vol. 86 1964, 3881-3882.

Foote, C. S., et al., "Correlation of Solvolysis Rates and Estimation of Rate Enhancements", *J. Am. Chem. Soc.* 86 1964, 1853-1854.

Foote, C. S., et al., "Olefin Oxidations with Excited Singlet Molecular Oxygen", *J. Am. Chem. Soc.* 86 1964, 3879-3880.

Foote, C. S., et al., "Singlet Oxygen. A Probable Intermediate in Photosensitized Autoxidations", *J. Am. Chem. Soc.* 86 1964, 3880-3881.

Furniss, Brian S., et al., "Resolution of Racemates", *Vogel's Textbook of Practical Organic Chemistry*; Fifth Ed, Longman Group UK Ltd., Essex 1989,809-816.

Gollnick, et al., "Mechanism and stereoselectivity of photosensitized oxygen transfer reactions.", *Applied Chem.* 9 1964, 507-525.

Haugland, Rosaria P., et al., "Coupling of Antibodies with Biotin", *The Protein Protocols Handbook*, vol. 418, Humana Press 1996, 13-23.

Haugland, Rosaria P., "Coupling of monoclonal antibodies with fluorophores",*Methods in Molecular Biology*, vol. 45 Monoclonal Antibody Protocols 1995, 205-221.

Heller, A., "Electrical Wiring of Redox Enzymes", *Acc. Chem. Res.* vol. 23, No. 5 1990, 128-134.

Howes, et al., "Microsomal (µS) Chemiluminescence (CL) Induced by NADPH and Its Relation to Aryl-Hydroxylations", *Res Commun. Chem. Pathol Pharmacol.*, vol. 3, No. 2 3 1972, 349-357.

Howes, et al., "Microsomal (µS) Chemiluminescence (CL) Induced by NADPH and Its Relation to Lip Peroxidation", *Res Commun. Chem. Pathol. Pharmacol 2*, Nos. 4 & 5 1971, 619-626.

Joshi, Saroj, et al., "ATP Synthase Complex from Bovine Heart Mitochondria", *J. Biol. Chem.*, vol. 265, No. 24 1990, 14518-14525.

Jung, Stephanie M., et al., "Crosslinking of platelet glycoprotein Ib by N-succinimidyl(4-azidophenyldithio)propionate and 3,3'-dithiobis(sulfosuccinimidyl propionate)", *Biochimica et Biophysica Acta*, vol. 761, Iss. 2 1983, 152-162.

McKeown, "Chemi-Luminescence As Diagnostic Feature of Heterolytic Reactions Which Produce Oxygen", *Nature* 203 1964, 1063.

Molecular Probes/Invitrogen, "The Molecular Probes Handbook", *Eleventh Edition* 2010, 1-1076.

Nickon, A., et al., "Reactivity and Geometry in Allylic Systems. IV. Stereospecific Conversion of Allylic Alcohols to Alpha, Beta-Epoxy Ketones aby Photosensitiezed Oxygenation.", *J. Am. Chem. Soc.* 87 1965, 3921-3928.

Park, Linda S., et al., "Characterization of the Cell Surface Receptor for a Multi-Lineage Colony-Stimulating Factor (CSF-2alpha)*", *J. Biol. Chem.*, vol 261, No. 1 1986, 205-210.

Ragu, B., et al., "A Fluorescent Indicator For Measuring Cytosolic Free Magnesium", *Am. J. Physiol.* 256 1989, C540.

Spatola, Arno F., et al., "Ch 5: Peptide Backbone Modifications: A Structure-Activity Analysis of Peptides Containing Amide Bond Surrogates, Conformational Constraints, and Rela", *Chemistry and Biochemistry of Amino Acids, Peptides and Proteins*, vol. 7 1983, 267-357.

Stauff, et al., *Physikal Chem. N. F.* 40 1964, 123.

Thompson, Q. E., "Ozone Oxidation of Nucleophilic Substances. I. Tertiary Phosphite Esters", *J. Am. Chem. Soc.* 83 1961, 845-851.

Zarling, David A., et al., "Mapping of Lymphocyte Surface Polypeptide Antigens by Chemical Cross-Linking with BSOCOES", *Journal of Immunology*, vol. 124, No. 2 1980, 913-920.

* cited by examiner

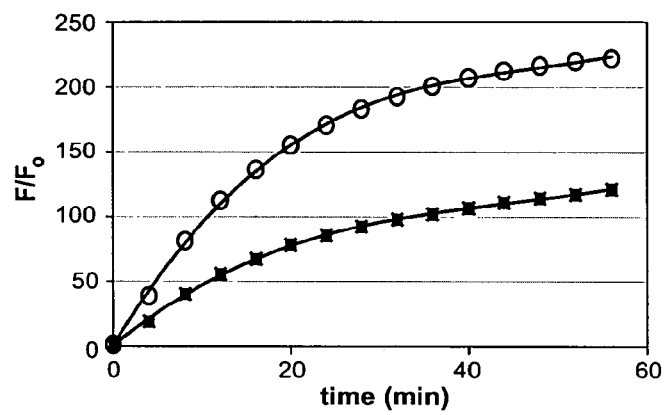
Figure 1. Fluorescence versus time plots for 1µM Compound 5 (○) or Compound 6 (■) in 100 mM 0.1 M phosphate buffer pH 10 containing 1 mM NaMoO$_4$ and 20 mM H$_2$O$_2$.
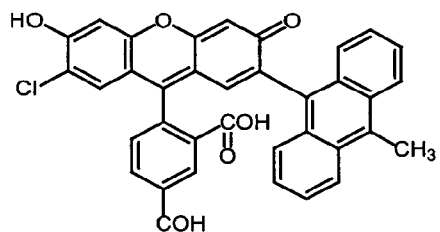
Compound 5
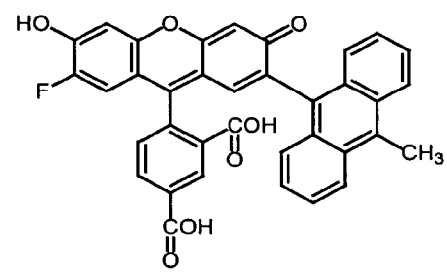
Compound 6

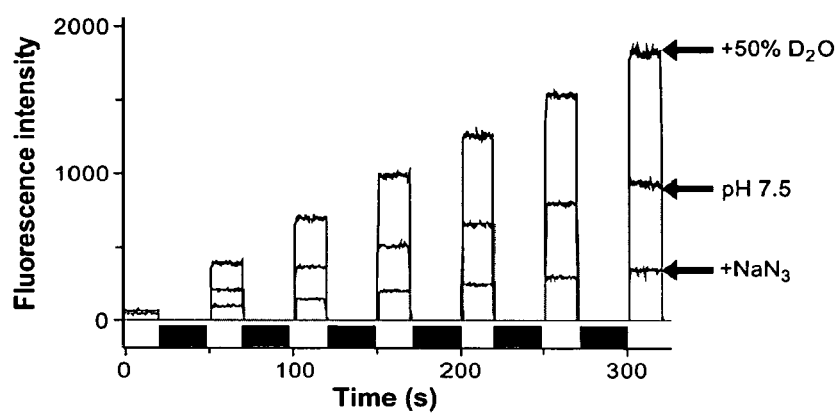
Figure 2. Fluorescence versus time traces for 1 µM Compound 5 in 50 mM phosphate buffer pH 7.5 containing 10 µM methylene blue. Black bars above the x-axis indicate 30-second periods of 630-680 nm laser irradiation.
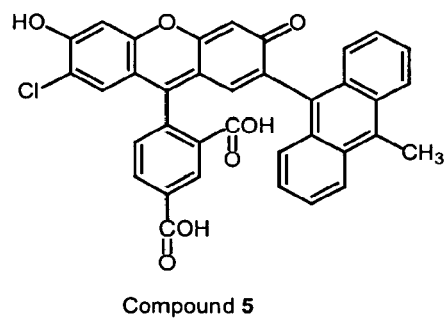
Compound 5

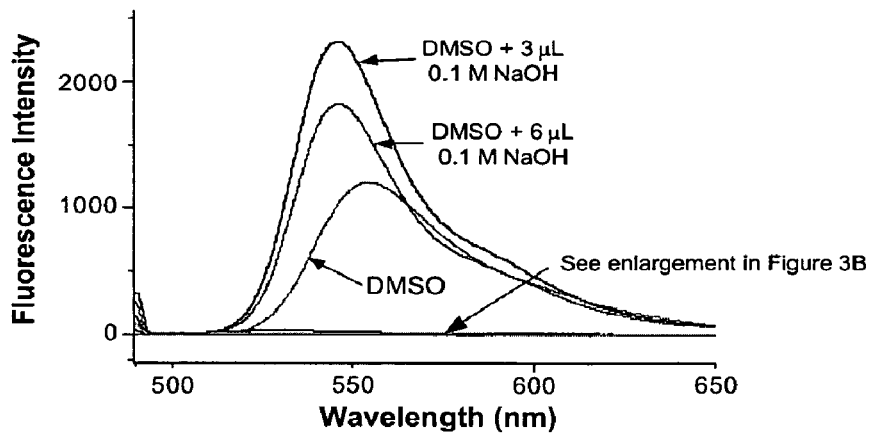
Figure 3A. Comparison of Compound 5 fluorescence emission spectra in DMSO, methanol and aqueous solutions.
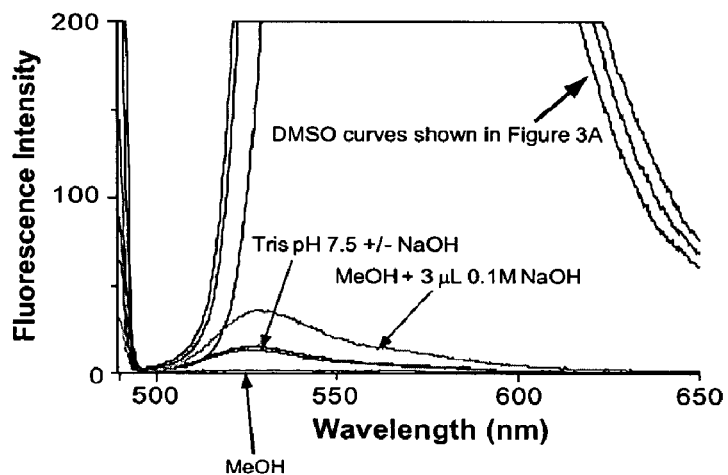
Figure 3B. Comparison of Compound 5 fluorescence emission spectra in DMSO, methanol and aqueous solutions.

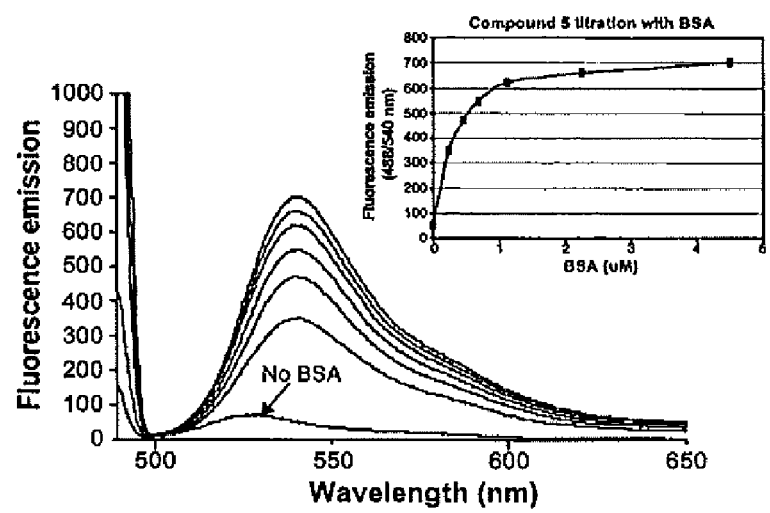
Figure 4. Fluorescence enhancement of Compound 5 upon binding to BSA (0-5 μM) in PBS. The inset graph shows the fluorescence intensity at the emission peak (540 nm) plotted against BSA concentration.

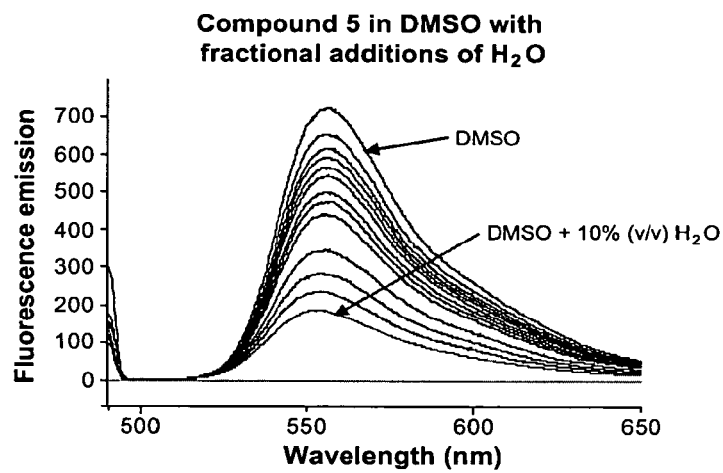
Figure 5A. Intermediate $H_2O$ additions are 0.1, 0.2, 0.3, 0.4, 0.5, 1.0, 1.5, 2.0, 4.0, 6.0, 8.0% (v/v), reading from top to bottom.
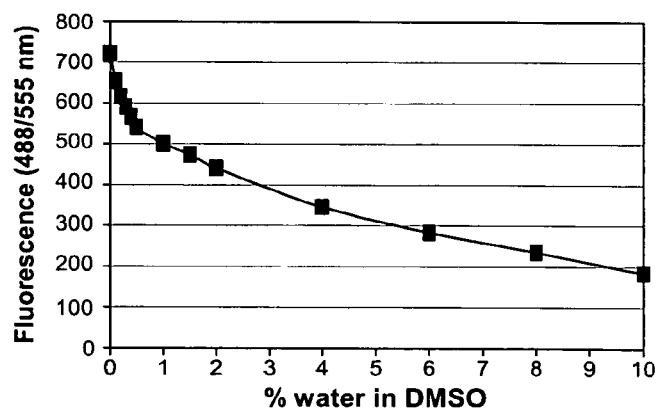
Figure 5B. Plot of peak fluorescence intensities from Figure 5A versus percentage (v/v) of water added to DMSO.

ENVIRONMENTAL SENSITIVE FLUOROGENIC COMPOUNDS AND THEIR APPLICATION FOR SINGLET OXYGEN AND PROTEIN DETECTION

CROSS-REFERENCE TO RELATED APPLICATIONS

This application claims priority of U.S. Ser. No. 60/523,749, filed Nov. 19, 2003, which disclosure is herein incorporated by reference.

FIELD OF THE INVENTION

The present invention relates to fluorogenic reagents that are environmentally sensitive. The invention has applications in the fields of immunology, diagnostics, molecular biology and fluorescence based assays.

BACKGROUND OF THE INVENTION

It is known that, in living bodies and life phenomena, free radical species such as nitrogen monoxide act as second messengers for signal transduction, as well as control blood pressure in the circulatory system. It has also been shown that superoxides and hydrogen peroxide play important roles in the proper functioning of the immune system and the like. However, while singlet oxygen ($^1O_2$) has an analogous electronic structure to these reactive oxygen species, its physiological role is not as well delineated.

Early work on the physiological role of singlet oxygen by Howes and Steele, *Res. Commun. Chem. Pathol. Pharmacol.* 2:619-626 (1971); *Res. Commun. Chem. Pathol. Pharmacol.* 3:349-357 (1972) suggest its possible involvement in liver microsomal hydroxylation reactions. Today, singlet oxygen is recognized as the principal bacterial oxidizing agent employed by human neutrophil (macrophage) and monocyte phagosome. In addition, singlet oxygen has been revealed to be a reactive species of photodynamic therapy, a form of cancer treatment. Roles for singlet oxygen in signal transduction as well as in oxidase and peroxidase-catalyzed reactions have also been theorized. A better understanding of the activity of singlet oxygen in living systems is therefore of great importance.

Numerous methods are known for the measurement of singlet oxygen in living systems. These methods employ chemiluminescence, luminescence, and electron spin resonance (ESR), among other tools. Unfortunately, current detection techniques are unreliable, as they all possess low specificity and sensitivity for singlet oxygen. In the past, fluorescent materials have provided the specificity and sensitivity needed to image other reactive oxygen species. Thus, an oxidatively sensitive fluorogenic probe that becomes stable and intensely fluorescent upon oxidation, emits fluorescence within a comparatively narrow wavelength range and can be used in conjunction with other dyes without interfering with their signals would represent a significant advance in the art. Furthermore, probes that localize within cellular compartments, e.g., cytosol, mitochondria, etc., particularly those implicated in the formation or reaction of singlet oxygen, would allow researchers to probe singlet oxygen formation and distribution at the subcellular level. The present invention provides such fluorogenic probes, conjugates including the probes and methods of using both the probes and the conjugates.

SUMMARY OF THE INVENTION

Oxidatively sensitive fluorogenic probes, such as those provided by the present invention, offer a number of advantages that are not realized with non-fluorescent probes for singlet oxygen. For example, fluorescent probes provide more sensitive measurement of singlet oxygen, the ability to take measurements in live cells over real time and the ability to combine the fluorogenic probes with other fluorogenic or fluorescent probes, in order to simultaneously investigate multiple parameters of live cellular function.

The present invention provides a novel class of anthracene-based fluorogenic probes that detect the presence of singlet oxygen. When the anthracene moiety undergoes oxidative conversion by singlet oxygen to the corresponding anthracene-endoperoxide, e.g., anthracene-9,10-endoperoxide, the fluorogenic probe is converted into a fluorescent probe. Furthermore, selected probes of the invention fluoresce without UV excitation, thereby allowing the detection of singlet oxygen while minimizing interfering signals from cell autofluorescence.

The probes of the invention also allow the collection of a wide variety of data, including data other than that directly available from interrogating the oxidized probe. For example, using probes of the current invention, mitochondria can be stained, the cell fixed and permeabilized, and a variety of labeling agents can then be utilized for simultaneous visualization of mitochondria and other cellular components. Also, because the oxidized probes emit fluorescence over a comparatively narrow wavelength range, the probes are highly useful in multi-color/multi-parametric applications, including microscopy and flow cytometry.

Thus, in a first aspect, the invention provides a fluorogenic probe that includes an oxidizable group such as an anthracene moiety bonded to a dye moiety. In an exemplary embodiment, the dye is fluorescein, and the anthracene moiety is covalently bonded to the fluorescein dye moiety at the 9-position of the anthracene moiety. In this embodiment, the anthracene is substituted with at least one substituted or unsubstituted $C_1$-$C_6$ alkyl moiety.

A wide variety of dye moieties are of use in the compounds of the invention. Exemplary dyes include substituted or unsubstituted coumarin, substituted or unsubstituted borapolyazaindacene (BODIPY), substituted or unsubstituted cyanine, substituted or unsubstituted styryl, substituted or unsubstituted dapoxyl, substituted or unsubstituted fluorescein, substituted or unsubstituted rhodamine, substituted or unsubstituted rhodol, substituted or unsubstituted oxazine, substituted or unsubstituted acridinone, and substituted or unsubstituted napthofluorescein. Among the dye moieties of use in the compounds of the invention are those that provide a fluorophore excitable by visible light when the attached anthracene moiety is oxidized.

In a second aspect, the fluorogenic probes and their oxidized fluorescent counterparts are used as free, unconjugated species or, optionally, they are conjugated to a reactive group, a carrier molecule, a solid support, or a combination thereof.

In a third aspect, the invention provides methods in which the fluorogenic probes are used to detect and/or quantify singlet oxygen in a sample by detecting fluorescence in the sample. The change in sample fluorescence is optionally detected in real time in certain applications. For example, the kinetics of singlet oxygen generation can be studied by following the time-course of the increase in sample fluorescence.

In a fourth aspect, kits are provided that include one or more fluorogenic or fluorescent probe of the invention and instructions for use of the probe.

Other objects, advantages and aspects of the present invention will be apparent from the detailed description that follows.

BRIEF DESCRIPTION OF THE FIGURES

FIG. 1 is a graphical presentation of data comparing the fluorescence of 1 µM of 5 (○) or 6 (■) in 100 mM 0.1 M phosphate buffer pH 10 as a function of time. Sodium molybdate (1 mM) and hydrogen peroxide (20 mM) were used as the singlet oxygen generation system.

FIG. 2 is a graphical presentation of data displaying fluorescence versus time traces for 1 µM of 5 in 50 mM phosphate buffer pH 7.5. Black bars above the x-axis indicate 30-second periods of 630-680 nm laser irradiation. Methylene blue (10 µM), ground state oxygen, and visible light were used as the singlet oxygen generation system.

FIG. 3: is a graphical comparison of the fluorescence intensity and wavelength fluorescence emission spectra for 5 in DMSO, methanol and aqueous solutions. FIG. 3B is a graphical comparison of the fluorescence intensity and wavelength fluorescence emission spectra for 5 in DMSO, methanol and aqueous solutions. FIG. 3B represents an approximately 10-fold enlargement of the y-axis over FIG. 3A.

FIG. 4: is a graphical presentation of data displaying fluorescence enhancement of 5 upon binding to BSA (0-5 µM) in PBS. The inset graph shows the fluorescence intensity at the emission peak (540 nm) plotted against BSA concentration.

FIG. 5A: is a graphical representation of data displaying fluorescence emission for 5 in DMSO with fractional additions of $H_2O$. Intermediate $H_2O$ additions are 0.1, 0.2, 0.3, 0.4, 0.5, 1.0, 1.5, 2.0, 4.0, 6.0, 8.0% (v/v), reading from top to bottom. FIG. 5B is a graphical representation of data displaying peak fluorescence intensities from FIG. 5A versus percentage (v/v) of water added to DMSO.

DETAILED DESCRIPTION OF THE INVENTION

Introduction

There is a continuous and expanding need for rapid, highly specific methods of detecting and quantifying chemical, biochemical and biological analytes in research and diagnostic mixtures. Of particular value are methods for measuring small quantities of nucleic acids, peptides (e.g., enzymes), pharmaceuticals, metabolites, microorganisms and other materials of diagnostic value. Examples of such materials include narcotics and poisons, drugs administered for therapeutic purposes, hormones, pathogenic microorganisms and viruses, antibodies, and enzymes and nucleic acids, particularly those implicated in disease states.

One method of detecting an analyte relies on directly or indirectly labeling the analyte or other component of the analysis mixture with a fluorescent species. Fluorescent labels have the advantage of requiring few precautions in handling, and being amenable to high-throughput visualization techniques (optical analysis including digitization of the image for analysis in an integrated system comprising a computer). Preferred labels are typically characterized by one or more of the following: high sensitivity, high stability, low background, low environmental sensitivity and high specificity in labeling.

As discussed herein, the present invention provides a new class of compounds containing an anthracene moiety and a dye moiety that are of use in the detection of singlet oxygen in a variety of analytical and diagnostic techniques. The present compounds demonstrate key advantages over known fluorogenic singlet oxygen sensors wherein they are stable over long periods of time (U.S. Pat. No. 5,525,088). This was an unexpected advantage that allows the present compounds to be marketed as commercial products.

DEFINITIONS

Before describing the present invention in detail, it is to be understood that this invention is not limited to specific compositions or process steps, as such may vary. It must be noted that, as used in this specification and the appended claims, the singular form "a", "an" and "the" include plural referents unless the context clearly dictates otherwise. Thus, for example, reference to "compound" includes a plurality of compounds and reference to "a sample" includes a plurality of samples and the like.

Unless defined otherwise, all technical and scientific terms used herein have the same meaning as commonly understood by one of ordinary skill in the art to which this invention is related. The following terms are defined for purposes of the invention as described herein.

Certain compounds of the present invention can exist in unsolvated forms as well as solvated forms, including hydrated forms. In general, the solvated forms are equivalent to unsolvated forms and are encompassed within the scope of the present invention. Certain compounds of the present invention may exist in multiple crystalline or amorphous forms. In general, all physical forms are equivalent for the uses contemplated by the present invention and are intended to be within the scope of the present invention.

Certain compounds of the present invention possess asymmetric carbon atoms (optical centers) or double bonds; the racemates, diastereomers, geometric isomers and individual isomers are encompassed within the scope of the present invention.

The compounds of the invention may be prepared as a single isomer (e.g., enantiomer, cis-trans, positional, diastereomer) or as a mixture of isomers. In a preferred embodiment, the compounds are prepared as substantially a single isomer. Methods of preparing substantially isomerically pure compounds are known in the art. For example, enantiomerically enriched mixtures and pure enantiomeric compounds can be prepared by using synthetic intermediates that are enantiomerically pure in combination with reactions that either leave the stereochemistry at a chiral center unchanged or result in its complete inversion. Alternatively, the final product or intermediates along the synthetic route can be resolved into a single stereoisomer. Techniques for inverting or leaving unchanged a particular stereocenter, and those for resolving mixtures of stereoisomers are well known in the art and it is well within the ability of one of skill in the art to choose an appropriate method for a particular situation. See, generally, Furniss et al. (eds.) VOGEL'S ENCYCLOPEDIA OF PRACTICAL ORGANIC CHEMISTRY $5^{TH}$ ED., Longman Scientific and Technical Ltd., Essex, 1991, pp. 809-816; and Heller, *Acc. Chem. Res.* 23:128 (1990).

The compounds of the present invention may also contain unnatural proportions of atomic isotopes at one or more of the atoms that constitute such compounds. For example, the compounds may be radiolabeled with radioactive isotopes, such as for example tritium ($^3H$), iodine-125 ($^{125}I$) or carbon-14 ($^{14}C$). All isotopic variations of the compounds of the present invention, whether radioactive or not, are intended to be encompassed within the scope of the present invention.

Where substituent groups are specified by their conventional chemical formulae, written from left to right, they equally encompass the chemically identical substituents, which would result from writing the structure from right to left, e.g., —$CH_2O$— is intended to also recite —$OCH_2$—.

The term "acyl" or "alkanoyl" by itself or in combination with another term, means, unless otherwise stated, a stable straight or branched chain, or cyclic hydrocarbon radical, or combinations thereof, consisting of the stated number of carbon atoms and an acyl radical on at least one terminus of the alkane radical. The "acyl radical" is the group derived from a carboxylic acid by removing the —OH moiety therefrom.

The term "alkyl," by itself or as part of another substituent means, unless otherwise stated, a straight or branched chain, or cyclic hydrocarbon radical, or combination thereof, which may be fully saturated, mono- or polyunsaturated and can include divalent ("alkylene") and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl." Alkyl groups that are limited to hydrocarbon groups are termed "homoalkyl".

Exemplary alkyl groups of use in the present invention contain between about one and about twenty five carbon atoms (e.g. methyl, ethyl and the like). Straight, branched or cyclic hydrocarbon chains having eight or fewer carbon atoms will also be referred to herein as "lower alkyl". In addition, the term "alkyl" as used herein further includes one or more substitutions at one or more carbon atoms of the hydrocarbon chain fragment.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The term "heteroalkyl," by itself or in combination with another term, means, unless otherwise stated, a straight or branched chain, or cyclic carbon-containing radical, or combinations thereof, consisting of the stated number of carbon atoms and at least one heteroatom selected from the group consisting of O, N, Si, P and S, and wherein the nitrogen, phosphorous and sulfur atoms are optionally oxidized, and the nitrogen heteroatom is optionally quaternized. The heteroatom(s) O, N, P, S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$,—S(O)—$CH_3$, —$CH_2$—$CH_2$—S(O)$_2$—$CH_3$, —CH=CH—O—$CH_3$, —Si($CH_3$)$_3$, —$CH_2$—CH=N—$OCH_3$, and —CH=CH—N($CH_3$)—$CH_3$. Up to two heteroatoms may be consecutive, such as, for example, —$CH_2$—NH—$OCH_3$ and —$CH_2$—O—Si($CH_3$)$_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)$_2$R'— represents both —C(O)$_2$R'— and —R'C(O)$_2$—.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The term "aryl" means, unless otherwise stated, a polyunsaturated, aromatic moiety that can be a single ring or multiple rings (preferably from 1 to 3 rings), which are fused together or linked covalently. The term "heteroaryl" refers to aryl groups (or rings) that contain from one to four heteroatoms selected from N, O, and S, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, tetrazolyl, benzo[b]furanyl, benzo[b]thienyl, 2,3-dihydrobenzo[1,4]dioxin-6-yl, benzo[1,3]dioxol-5-yl and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") includes both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: —OR', =O, =NR', =N—OR', —NR'R", —SR', -halogen, —SiR'R"R'", —OC(O)R', —C(O)R', —$CO_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R'" and R'''' each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R''' and R'''' groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —$CF_3$ and —$CH_2CF_3$) and acyl (e.g., —C(O)$CH_3$, —C(O)$CF_3$, —C(O)$CH_2OCH_3$, and the like).

Similar to the substituents described for the alkyl radical, substituents for the aryl and heteroaryl groups are generically referred to as "aryl group substituents." The substituents are selected from, for example: halogen, —OR', =O, =NR', =N—OR', —NR'R", —SR', -halogen, —SiR'R"R''', —OC(O)R', —C(O)R', —$CO_2$R', —CONR'R", —OC(O)NR'R", —NR"C(O)R', —NR'—C(O)NR"R''', —NR"C(O)$_2$R', —NR—C(NR'R"R''')=NR" ", —NR—C(NR'R")=NR''', —S(O)R', —S(O)$_2$R', —S(O)$_2$NR'R", —NRSO$_2$R', —CN and —$NO_2$, —R', —$N_3$, —CH(Ph)$_2$, fluoro($C_1$-$C_4$)alkoxy, and fluoro($C_1$-$C_4$)alkyl, in a number ranging from zero to the total number of open valences on the aromatic ring system; and where R', R", R''' and R'''' are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R''' and R'''' groups when more than one of these groups is present. In the schemes that follow, the symbol X represents "R" as described above.

Two of the substituents on adjacent atoms of the aryl or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-($CH_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X—(CR"R''')$_d$—, where s and d are independently integers of from 0 to 3, and X is —O—, —NR'—, —S—, —S(O)—, —S(O)$_2$—, or —S(O)$_2$NR'—. The substituents R, R', R" and R''' are preferably independently selected from hydrogen or substituted or unsubstituted ($C_1$-$C_6$)alkyl.

As used herein, the term "heteroatom" includes oxygen (O), nitrogen (N), sulfur (S), phosphorus (P) and silicon (Si).

The term "amino" or "amine group" refers to the group —NR'R" (or N$^+$RR'R") where R, R' and R" are independently selected from the group consisting of hydrogen, alkyl, substituted alkyl, aryl, substituted aryl, aryl alkyl, substituted aryl alkyl, heteroaryl, and substituted heteroaryl. A substituted amine being an amine group wherein R' or R" is other than hydrogen. In a primary amino group, both R' and R" are hydrogen, whereas in a secondary amino group, either, but not both, R' or R" is hydrogen. In addition, the terms "amine" and "amino" can include protonated and quaternized versions of nitrogen, comprising the group —N$^+$RR'R" and its biologically compatible anionic counterions.

The term "aqueous solution" as used herein refers to a solution that is predominantly water and retains the solution characteristics of water. Where the aqueous solution contains solvents in addition to water, water is typically the predominant solvent.

The term "buffer" as used herein refers to a system that acts to minimize the change in acidity or basicity of the solution against addition or depletion of chemical substances.

The term "carbonyl" as used herein refers to the functional group —(C=O)—. However, it will be appreciated that this group may be replaced with other well-known groups that have similar electronic and/or steric character, such as thiocarbonyl (—(C=S)—); sulfinyl (—S(O)—); sulfonyl (—$SO_2$)—), phosphonyl (—$PO_2$—).

The term "Carboxyalkyl" as used herein refers to a group having the general formula —($CH_2$)$_n$COOH wherein n is 1-18.

The term "carrier molecule" as used herein refers to a fluorogenic, fluorescent or colorimetric compound of the present invention that is covalently bonded to a biological or a non-biological component. Such components include, but are not limited to, an amino acid, a peptide, a protein, a polysaccharide, a nucleoside, a nucleotide, an oligonucleotide, a nucleic acid, a hapten, a psoralen, a drug, a hormone, a lipid, a lipid assembly, a synthetic polymer, a polymeric microparticle, a biological cell, a virus and combinations thereof.

The term "detectable response" as used herein refers to an occurrence of or a change in, a signal that is directly or indirectly detectable either by observation or by instrumentation. Typically, the detectable response is an optical response resulting in a change in the wavelength distribution patterns or intensity of absorbance or fluorescence or a change in light scatter, fluorescence lifetime, fluorescence polarization, or a combination of the above parameters.

The term "dye" as used herein refers to a compound that emits light to produce an observable detectable signal. "Dye" includes fluorescent and nonfluorescent compounds that include without limitations pigments, fluorophores, chemiluminescent compounds, luminescent compounds and chromophores. The term "fluorophore" as used herein refers to a composition that is inherently fluorescent or demonstrates a change in fluorescence upon binding to a biological compound or metal ion, or metabolism by an enzyme, i.e., fluorogenic. Fluorophores may be substituted to alter the solubility, spectral properties or physical properties of the fluorophore. Fluorophores of the present invention are not sulfonated. Numerous fluorophores are known to those skilled in the art and include, but are not limited to benzofurans, quinolines, quinazolinones, indoles, benzazoles, borapolyazaindacenes and xanthenes, with the latter including fluoresceins, rhodamines and rhodols as well as other fluorophores described in RICHARD P. HAUGLAND, MOLECULAR PROBES HANDBOOK OF FLUORESCENT PROBES AND RESEARCH CHEMICALS (9$^{th}$ edition, including the CD-ROM, September 2002).

The term "kit" as used refers to a packaged set of related components, typically one or more compounds or compositions.

The term "Linker" or "L", as used herein, refers to a single covalent bond or a series of stable covalent bonds incorporating 1-20 nonhydrogen atoms selected from the group consisting of C, N, O, S and P that covalently attach the fluorogenic or fluorescent compounds to another moiety such as a chemically reactive group or a biological and non-biological component. Exemplary linking members include a moiety that includes —C(O)NH—, —C(O)O—, —NH—, —S—, —O—, and the like. A "cleavable linker" is a linker that has one or more cleavable groups that may be broken by the result of a reaction or condition. The term "cleavable group" refers to a moiety that allows for release of a portion, e.g., a fluorogenic or fluorescent moiety, of a conjugate from the remainder of the conjugate by cleaving a bond linking the released moiety to the remainder of the conjugate. Such cleavage is either chemical in nature, or enzymatically mediated. Exemplary enzymatically cleavable groups include natural amino acids or peptide sequences that end with a natural amino acid.

In addition to enzymatically cleavable groups, it is within the scope of the present invention to include one or more sites that are cleaved by the action of an agent other than an enzyme. Exemplary non-enzymatic cleavage agents include, but are not limited to, acids, bases, light (e.g., nitrobenzyl derivatives, phenacyl groups, benzoin esters), and heat. Many cleaveable groups are known in the art. See, for example, Jung et al., *Biochem. Biophys. Acta,* 761: 152-162 (1983); Joshi et al., *J. Biol. Chem.,* 265: 14518-14525 (1990); Zarling et al., *J. Immunol.,* 124: 913-920 (1980); Bouizar et al., *Eur. J. Biochem.,* 155: 141-147 (1986); Park et al., *J. Biol. Chem.,* 261: 205-210 (1986); Browning et al., *J. Immunol.,* 143: 1859-1867 (1989). Moreover a broad range of cleavable, bifunctional (both homo- and hetero-bifunctional) spacer arms are commercially available.

An exemplary cleavable group, an ester, is cleavable group that may be cleaved by a reagent, e.g. sodium hydroxide, resulting in a carboxylate-containing fragment and a hydroxyl-containing product.

The linker can be used to attach the compound to another component of a conjugate, such as a targeting moiety (e.g., antibody, ligand, non-covalent protein-binding group, etc.), an analyte, a biomolecule, a drug and the like.

The terms "protein" and "polypeptide" are used herein in a generic sense to include polymers of amino acid residues of any length. The term "peptide" as used herein refers to a polymer in which the monomers are amino acids and are joined together through amide bonds, alternatively referred to as a polypeptide. When the amino acids are α-amino acids, either the L-optical isomer or the D-optical isomer can be used. Additionally, unnatural amino acids, for example, β-alanine, phenylglycine and homoarginine are also included. Commonly encountered amino acids that are not gene-encoded may also be used in the present invention. All of the amino acids used in the present invention may be either the D- or L-isomer. The L-isomers are generally preferred. In addition, other peptidomimetics are also useful in the present invention. For a general review, see Spatola, A. F., in *Chemistry and Biochemistry of Amino Acids, Peptides and Proteins*, B. Weinstein, eds., Marcel Dekker, New York, p. 267 (1983).

The term "reactive group" as used herein refers to a group that is capable of reacting with another chemical group to form a covalent bond, i.e. is covalently reactive under suitable reaction conditions, and generally represents a point of attachment for another substance. The reactive group is a moiety, such as carboxylic acid or succinimidyl ester, on the compounds of the present invention that is capable of chemically reacting with a functional group on a different compound to form a covalent linkage. Reactive groups generally include nucleophiles, electrophiles and photoactivatable groups.

Exemplary reactive groups include, but are not limited to, olefins, acetylenes, alcohols, phenols, ethers, oxides, halides, aldehydes, ketones, carboxylic acids, esters, amides, cyanates, isocyanates, thiocyanates, isothiocyanates, amines, hydrazines, hydrazones, hydrazides, diazo, diazonium, nitro, nitriles, mercaptans, sulfides, disulfides, sulfoxides, sulfones, sulfonic acids, sulfinic acids, acetals, ketals, anhydrides, sulfates, sulfenic acids isonitriles, amidines, imides, imidates, nitrones, hydroxylamines, oximes, hydroxamic acids thiohydroxamic acids, allenes, ortho esters, sulfites, enamines, ynamines, ureas, pseudoureas, semicarbazides, carbodiimides, carbamates, imines, azides, azo compounds, azoxy compounds, and nitroso compounds. Reactive functional groups also include those used to prepare bioconjugates, e.g., N-hydroxysuccinimide esters, maleimides and the like. Methods to prepare each of these functional groups are well known in the art and their application to or modification for a particular purpose is within the ability of one of skill in the art (see, for example, Sandler and Karo, eds. ORGANIC FUNCTIONAL GROUP PREPARATIONS, Academic Press, San Diego, 1989).

The term "salt thereof," as used herein includes salts of the agents of the invention and their conjugates, which are preferably prepared with relatively nontoxic acids or bases, depending on the particular substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassium, calcium, ammonium, organic amino, or magnesium, or a similar salt. When compounds of the present invention contain relatively basic functionalities, acid addition salts can be obtained by contacting the neutral form of such compounds with a sufficient amount of the desired acid, either neat or in a suitable inert solvent. Examples of addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived from relatively nontoxic organic acids like acetic, propionic, isobutyric, maleic, malonic, benzoic, succinic, suberic, fumaric, lactic, mandelic, phthalic, benzenesulfonic, p-tolylsulfonic, citric, tartaric, methanesulfonic, and the like. Also included are salts of amino acids such as arginate and the like, and salts of organic acids like glucuronic or galactunoric acids and the like (see, for example, Berge et al., "Pharmaceutical Salts", *Journal of Pharmaceutical Science,* 1977, 66, 1-19). Certain specific compounds of the present invention contain both basic and acidic functionalities that allow the compounds to be converted into either base or acid addition salts.

The term "sample" as used herein refers to any material that may contain singlet oxygen. The sample may also include diluents, buffers, detergents, and contaminating species, debris and the like that are found mixed with the target. Illustrative examples include urine, sera, blood plasma, total blood, saliva, tear fluid, cerebrospinal fluid, secretory fluids and the like. Also included are solid, gel or solid substances such as mucus, body tissues, cells and the like suspended or dissolved in liquid materials such as buffers, extractants, solvents and the like. Typically, the sample is a live cell, a biological fluid that comprises endogenous host cell proteins, nucleic acid polymers, nucleotides, oligonucleotides, peptides and buffer solutions. The sample may be in an aqueous solution, a viable cell culture or immobilized on a solid or semi solid surface such as a polyacrylamide gel, membrane blot or on a microarray.

The term "solid support," as used herein, refers to a material that is substantially insoluble in a selected solvent system, or which can be readily separated (e.g., by precipitation) from a selected solvent system in which it is soluble. Solid supports useful in practicing the present invention can include groups that are activated or capable of activation to allow selected species to be bound to the solid support. Solid supports may be present in a variety of forms, including a chip, wafer or well, onto which an individual, or more than one compound, of the invention is bound such as a polymeric bead or particle.

The term "sulfoalkyl," as used herein refers to a group having the general formula —$(CH_2)_nSO_3$ wherein n is 1-18.

The Compounds

In general, for ease of understanding the present invention, the dye moieties and oxidizable moieties will first be described in detail, followed by the many and varied methods in which the compounds find uses, which is followed by exemplified methods of use and synthesis of certain novel compounds that are particularly advantageous for use with the methods of the present invention.

The present invention provides fluorogenic compounds useful for the detection of singlet oxygen. The compounds are generally represented by the general formula D-(L)n-M, wherein D is a dye moiety, L is a linker, M is an oxidizable moiety and n is 0 or 1. Thus, the compounds include a dye moiety covalently bonded to an aryl or heteroaryl moiety, e.g. anthracene, wherein after being oxidized by singlet oxygen becomes fluorescent. These fluorescent compounds have applications as dye compounds in any application wherein a fluorescent dye is useful. The components of the compounds of the invention are disclosed in greater detail below.

Dye Moiety of the Compounds

Dye moieties include, without limitation, a chromophore, a fluorophore, a fluorescent protein, a phosphorescent dye, and a tandem dye (energy transfer pair). Preferred dye moieties include chromophores or fluorophores.

A dye of the present invention is any chemical moiety that exhibits an absorption maximum beyond 280 nm. Dyes of the present invention include, without limitation; a pyrene, an anthracene, a naphthalene, an acridine, a stilbene, an indole or benzindole, an oxazole or benzoxazole, a thiazole or benzothiazole, a 4-amino-7-nitrobenz-2-oxa-1,3-diazole (NBD), a carbocyanine (including any corresponding compounds in U.S. Ser. Nos. 09/557,275; 09/968,401 and 09/969,853 and U.S. Pat. Nos. 6,403,807; 6,348,599; 5,486,616; 5,268,486; 5,569,587; 5,569,766; 5,627,027 and 6,048,982), a carbostyryl, a porphyrin, a salicylate, an anthranilate, an azulene, a perylene, a pyridine, a quinoline, a borapolyazaindacene (including any corresponding compounds disclosed in U.S. Pat. Nos. 4,774,339; 5,187,288; 5,248,782; 5,274,113; and 5,433,896), a xanthene (including any corresponding compounds disclosed in U.S. Pat. Nos. 6,162,931; 6,130,101; 6,229,055; 6,339,392; 5,451,343 and U.S. Ser. No. 09/922, 333), an oxazine or a benzoxazine, a carbazine (including any corresponding compounds disclosed in U.S. Pat. No. 4,810, 636), a phenalenone, a coumarin (including an corresponding compounds disclosed in U.S. Pat. Nos. 5,696,157; 5,459,276; 5,501,980 and 5,830,912), a benzofuran (including an corresponding compounds disclosed in U.S. Pat. Nos. 4,603,209 and 4,849,362) and benzphenalenone (including any corresponding compounds disclosed in U.S. Pat. No. 4,812,409) and derivatives thereof. As used herein, oxazines include resorufins (including any corresponding compounds disclosed in U.S. Pat. No. 5,242,805), aminooxazinones, diaminooxazines, and their benzo-substituted analogs.

Where the dye is a xanthene, the dye is optionally a fluorescein, a rhodol (including any corresponding compounds disclosed in U.S. Pat. Nos. 5,227,487 and 5,442,045), a rhodamine (including any corresponding compounds in U.S. Pat. Nos. 5,798,276 and 5,846,737). As used herein, rhodamine and rhodol dyes include, among other derivatives, compounds that comprise xanthenes with saturated or unsaturated "julolidine" rings. As used herein, fluorescein includes benzo- or dibenzofluoresceins, seminaphthofluoresceins, or naphthofluoresceins. Similarly, as used herein rhodol includes seminaphthorhodafluors (including any corresponding compounds disclosed in U.S. Pat. No. 4,945,171).

Preferred dyes of the present invention include xanthene, oxazine, dapoxyl, 7-nitro-1,2,3-benzoxadiazole (NBD), acridinone, carbocyanine compounds and borapolyazaindacenes. Preferred xanthenes include fluoresceins, rhodols, rhodamines and rosamines. Xanthenes of this invention comprise both compounds substituted and unsubstituted on the carbon atom of the central ring of the xanthene by substituents typically found in the xanthene-based dyes such as phenyl and substituted-phenyl moieties. Most preferred dyes are rhodamine, fluorescein, borapolyazaindacene, indole and benzofuran. The choice of the dye will determine the fluorescent compound's absorption and fluorescence emission properties as well as its live cell properties, i.e. ability to enter live cells.

In another exemplary embodiment, the dye contains one or more aryl or heteroaryl rings that are optionally substituted one or more times by a variety of substituents. The substituents are selected from, for example: alkyl, perfluoroalkyl, alkoxy, alkenyl, alkynyl, cycloalkyl, arylalkyl, acyl, aryl, heteroaryl, —OR', =O, =NR', =N—OR', —NR'R'', —SR', -halogen, —SiR'R''R''', —OC(O)R', —C(O)R', —$CO_2$R', —CONR'R'', —OC(O)NR'R'', —NR''C(O)R', —NR'—C(O) NR''R''', —NR''C(O)$_2$R', —NR—C(NR'R''R''')=NR'''', —NR—C(NR'R'')=NR''', —S(O)R', —S(O)$_2$R', —S(O)$_2$ NR'R'', —NRSO$_2$R', —CN and —NO$_2$, —R', —N$_3$, —CH (Ph)$_2$, fluoro($C_1$-$C_4$)alkoxy, and fluoro($C_1$-$C_4$)alkyl, in a number ranging from zero to the total number of open valences on the aromatic ring system. The symbols R', R'', R''' and R'''' preferably independently represent hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R'', R''' and R'''' groups when more than one of these groups is present. In the schemes that follow, the symbol X represents "R" as described above.

In one aspect of the invention, the dye has an absorption maximum beyond 480 nm. In a particularly useful embodiment, the dye absorbs at or near 488 nm to 514 nm (particularly suitable for excitation by the output of the argon-ion laser excitation source) or near 546 nm (particularly suitable for excitation by a mercury arc lamp). As is the case for many dyes, they can also function as both chromophores and fluorophores, resulting in compounds that simultaneously act both as colorimetric and fluorescent probes for singlet oxygen. Thus, the described fluorescent dyes are also the preferred chromophores of the present invention.

In an exemplary embodiment, the dye moiety has a formula which is a member selected from:

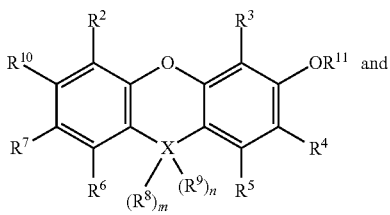

In this embodiment, at least one member selected from $R^2$, $R^3$, $R^4$, $R^5$, $R^6$, $R^7$, $R^8$ and $R^9$ is a substituted or unsubstituted anthracene moiety. If the index m represents 1 and $R^8$ is substituted or unsubstituted anthracene, then the anthracene moiety is not attached through the 3-position, and the anthracene moiety does not have a carboxylic acid moiety covalently bonded to its 2-position.

$R^2$, $R^3$, $R^4$, $R^5$, $R^6$, and $R^7$ are independently hydrogen, —OH, —$NO_2$, —$NR^{12}R^{13}$, —$SO_2R^{12}$, halogen, substituted alkyl, unsubstituted alkyl, substituted heteroalkyl, unsubstituted heteroalkyl, substituted cycloalkyl, unsubstituted cycloalkyl, substituted heterocycloalkyl, unsubstituted heterocycloalkyl, substituted aryl, unsubstituted aryl, substituted heteroaryl, unsubstituted heteroaryl, substituted reactive group, unsubstituted reactive group, substituted carrier molecule, unsubstituted carrier molecule, substituted solid support, unsubstituted solid support, substituted anthracene moiety or a unsubstituted anthracene moiety. Alternatively a member selected from $R^6$ in combination with $R^7$; $R^7$ in combination with $R^{10}$; $R^{10}$ in combination with $R^2$; $R^3$ in combination with $R^{11}$; $R^{11}$ in combination with $R^4$; or $R^4$ in combination with $R^5$ together with the atoms to which they are joined, form a ring which is a 5-, 6- or 7-membered cycloalkyl, a substituted 5-, 6- or 7-membered cycloalkyl, a 5-, 6- or 7-membered heterocycloalkyl, a substituted 5-, 6- or 7-membered heterocycloalkyl, a 5-, 6- or 7-membered aryl, a substituted 5-, 6- or 7-membered aryl, a 5-, 6- or 7-membered heteroaryl, or a substituted 5-, 6- or 7-membered heteroaryl.

$R^{12}$ and $R^{13}$ are independently hydrogen, —OH, —$NH_2$, substituted alkyl, unsubstituted alkyl, substituted heteroalkyl, unsubstituted heteroalkyl, substituted cycloalkyl, unsubstituted cycloalkyl, substituted heterocycloalkyl, unsubstituted heterocycloalkyl, substituted aryl, unsubstituted aryl, substituted heteroaryl, or unsubstituted heteroaryl.

$R^8$ is hydrogen, halogen, cyano, substituted alkyl, unsubstituted alkyl, substituted heteroalkyl, unsubstituted heteroalkyl, substituted aryl, unsubstituted aryl (e.g. phenyl), substituted reactive group, unsubstituted reactive group, substituted carrier molecule, unsubstituted carrier molecule, substituted solid support, unsubstituted solid support.

In an exemplary embodiment. $R^8$ is:

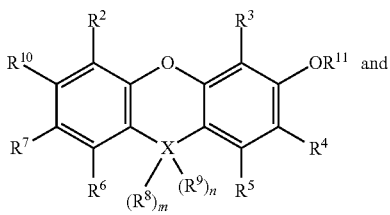

The symbols $R^{14}$, $R^{15}$, $R^{16}$, $R^{17}$ and $R^{18}$ represent groups that are independently hydrogen, —OH, —$NO_2$, —$NR^{12}R^{13}$, —$SO_2R^{12}$, $CO_2R^{12}$, halogen, substituted alkyl, unsubstituted alkyl, substituted heteroalkyl, unsubstituted heteroalkyl, substituted reactive group, unsubstituted reactive group, substituted carrier molecule, unsubstituted carrier molecule, substituted solid support, or unsubstituted solid support. The symbol X represents C or N. The index m is 0 and 1. The index n is 0 and 1.

$R^9$ is hydrogen, —OH, halogen, —CN, —$NO_2$, —$NR^{12}R^{13}$, —$SO_2R^{12}$, substituted alkyl, unsubstituted alkyl, substituted heteroalkyl, unsubstituted heteroalkyl, substituted reactive group, unsubstituted reactive group, substituted carrier molecule, unsubstituted carrier molecule, substituted solid support, or unsubstituted solid support. Alternatively, a member selected from $R^9$ in combination with $R^8$; or $R^9$ in combination with $R^{14}$ together with the atoms to which they are joined form a substituted 5- or 6-membered spirolactone ring, unsubstituted 5- or 6-membered spirolactone ring, substituted 5- or 6-membered spirosultone ring or unsubstituted 5- or 6-membered spirosultone ring.

$R^{10}$ is —$OR^{30}$ or —$NR^{30}R^{12}$. $R^{11}$ is hydrogen, substituted alkyl, unsubstituted alkyl, substituted heteroalkyl, unsubstituted heteroalkyl, substituted acyl, unsubstituted acyl, substituted heteroacyl, unsubstituted heteroacyl, substituted cycloalkyl, unsubstituted cycloalkyl, substituted heterocycloalkyl, unsubstituted heterocycloalkyl, substituted aryl, unsubstituted aryl, substituted heteroaryl, or unsubstituted heteroaryl.

$R^{30}$ is a member selected from H, substituted or unsubstituted $C_1$-$C_{18}$ alkyl, substituted or unsubstituted $C_1$-$C_{18}$ heteroalkyl, substituted or unsubstituted $C_1$-$C_{18}$ acyl, substituted or unsubstituted $C_1$-$C_{18}$ heteroacyl, substituted or unsubstituted $C_1$-$C_{18}$ aryl, and substituted or unsubstituted $C_1$-$C_{18}$ heteroaryl. In this embodiment, a member selected from $R^9$ in combination with $R^8$, or $R^9$ in combination with $R^{14}$ together with the atoms to which they are joined optionally form a substituted or unsubstituted 5- or 6-membered spirolactone or spirosultone ring. In this embodiment, $R^{30}$ in combination with $R^2$; or $R^{30}$ in combination with $R^7$, together with the atoms to which they are joined form a ring which is a 5-, 6- or 7-membered cycloalkyl, a substituted 5-, 6- or 7-membered cycloalkyl, a 5-, 6- or 7-membered heterocycloalkyl, a substituted 5-, 6- or 7-membered heterocycloalkyl, a 5-, 6- or 7-membered aryl, a substituted 5-, 6- or 7-membered aryl, a 5-, 6- or 7-membered heteroaryl, or a substituted 5-, 6- or 7-membered heteroaryl.

In another exemplary embodiment, the compound has a structure according to the following formula:

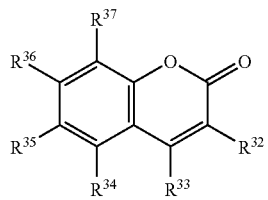

in which at least one member selected from $R^{32}$, $R^{33}$, $R^{34}$, $R^{35}$, $R^{36}$, and $R^{37}$ is a substituted or unsubstituted anthracene moiety. $R^{32}$, $R^{33}$, $R^{34}$, $R^{35}$, $R^{36}$, and $R^{37}$ are independently selected from H, OH, —$NO_2$, —$NR^{12}R^{13}$, —$SO_2R^{12}$, halogen, a reactive group, a carrier molecule, substituted or unsubstituted $C_1$-$C_{18}$ alkyl, substituted or unsubstituted $C_1$-$C_{18}$ heteroalkyl, substituted or unsubstituted $C_1$-$C_{18}$ cycloalkyl, substituted or unsubstituted $C_1$-$C_{18}$ heterocycloalkyl, substituted or unsubstituted $C_1$-$C_{18}$ aryl, and substituted or unsubstituted $C_1$-$C_{18}$ heteroaryl. $R^{12}$ and $R^{13}$ are independently selected from H, substituted or unsubstituted $C_1$-$C_{18}$ alkyl, substituted or unsubstituted $C_1$-$C_{18}$ heteroalkyl, substituted or unsubstituted $C_1$-$C_{18}$ cycloalkyl, substituted or unsubstituted $C_1$-$C_{18}$ heterocycloalkyl, substituted or unsubstituted $C_1$-$C_{18}$ aryl, and substituted or unsubstituted $C_1$-$C_{18}$ heteroaryl.

In another exemplary embodiment, the compound has a structure according to the following formula:

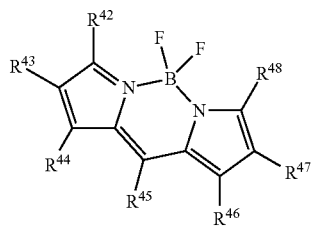

in which at least one member selected from $R^{42}$, $R^{43}$, $R^{44}$, $R^{45}$, $R^{46}$, $R^{47}$ and $R^{48}$ is a substituted or unsubstituted anthracene moiety. $R^{42}$, $R^{43}$, $R^{44}$, $R^{45}$, $R^{46}$, $R^{47}$ and $R^{48}$ are independently selected from H, —OH, —$NO_2$, —$NR^{12}R^{13}$, —$SO_2R^{12}$, halogen, a reactive group, a carrier molecule, substituted or unsubstituted $C_1$-$C_{18}$ alkyl, substituted or unsubstituted $C_1$-$C_{18}$ heteroalkyl, substituted or unsubstituted $C_1$-$C_{18}$ cycloalkyl, substituted or unsubstituted $C_1$-$C_{18}$ heterocycloalkyl, substituted or unsubstituted $C_1$-$C_{18}$ aryl, and substituted or unsubstituted $C_1$-$C_{18}$ heteroaryl. $R^{12}$ and $R^{13}$ are independently selected from H, —OH, —$NH_2$, substituted or unsubstituted $C_1$-$C_{18}$ alkyl, substituted or unsubstituted $C_1$-$C_{18}$ heteroalkyl, substituted or unsubstituted $C_1$-$C_{18}$ cycloalkyl, substituted or unsubstituted $C_1$-$C_{18}$ heterocycloalkyl, substituted or unsubstituted $C_1$-$C_{18}$ aryl, and substituted or unsubstituted $C_1$-$C_{18}$ heteroaryl.

Oxidizable Moiety

The compounds of the invention include an oxidizable aryl or heteroaryl moiety attached to the dye moiety. An exemplary oxidizable moiety is a substituted or unsubstituted anthracene. The bond between the dye moiety and the oxidizable moiety can be formed between atoms at any acceptable position on these two molecules.

In an exemplary embodiment, the compounds of the invention are fluorogenic and therefore capable of a change in fluorescence upon the binding of singlet oxygen. In a representative embodiment, the oxidizable moiety is an anthracene, which has the following formula:

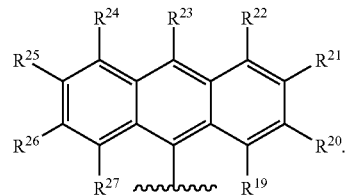

In this embodiment, $R^{19}$, $R^{20}$, $R^{21}$, $R^{22}$, $R^{23}$, $R^{24}$, $R^{25}$, $R^{26}$ and $R^{27}$ are independently hydrogen, halogen, $SO_2R^2$, $CO_2R^2$, substituted alkyl, unsubstituted alkyl, substituted heteroalkyl, unsubstituted heteroalkyl, substituted cycloalkyl, unsubstituted cycloalkyl, substituted heterocycloalkyl, unsubstituted heterocycloalkyl, substituted aryl, unsubstituted aryl, substituted heteroaryl, or unsubstituted heteroaryl, substituted reactive group, unsubstituted reactive group, substituted carrier molecule, unsubstituted carrier molecule, substituted solid support, or unsubstituted solid support. $R^{12}$ is hydrogen, —OH, —$NH_2$, substituted alkyl, unsubstituted alkyl, substituted heteroalkyl, unsubstituted heteroalkyl, substituted cycloalkyl, unsubstituted cycloalkyl, substituted heterocycloalkyl, unsubstituted heterocycloalkyl, substituted aryl, unsubstituted aryl, substituted heteroaryl, or unsubstituted heteroaryl.

In an exemplary embodiment, when the dye moiety is fluorescein, and the fluorescein is covalently bonded at its 9-position to the anthracene moiety at its 3-position, then the anthracene does not have a carboxylic acid substituted at its 2-position.

In another exemplary embodiment, the compound has a formula which is a member selected from:

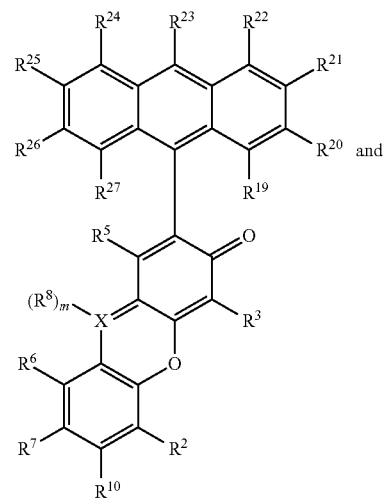

and

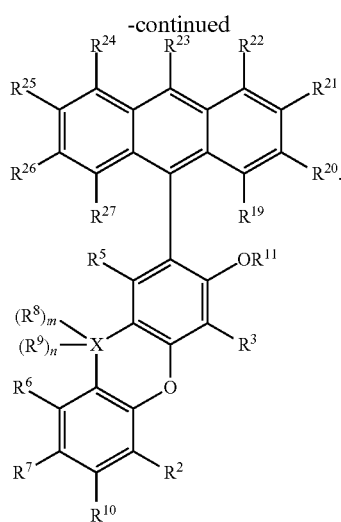
In another exemplary embodiment, $R^2$, $R^3$, $R^5$, and $R^6$ are H.
Representative compounds of the invention have a formula which is a member selected from:
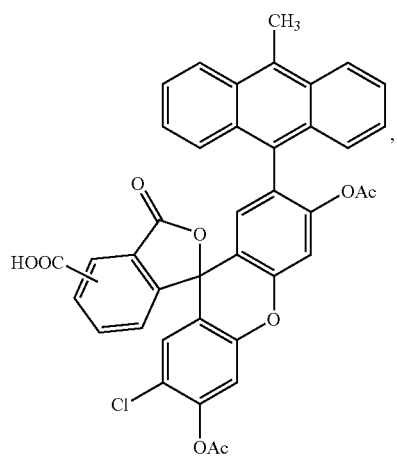
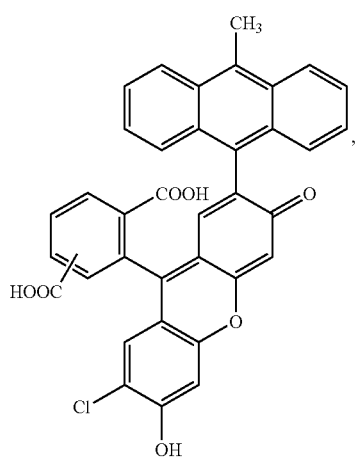
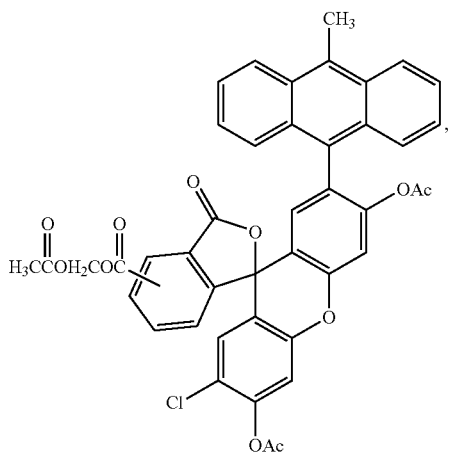
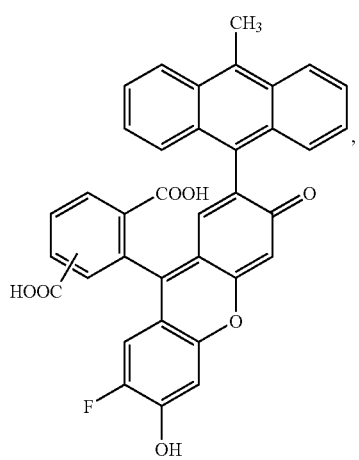
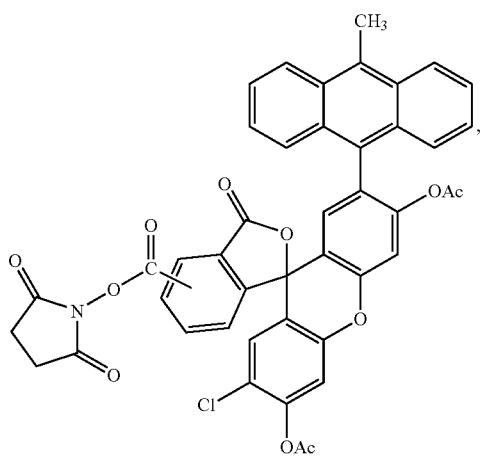

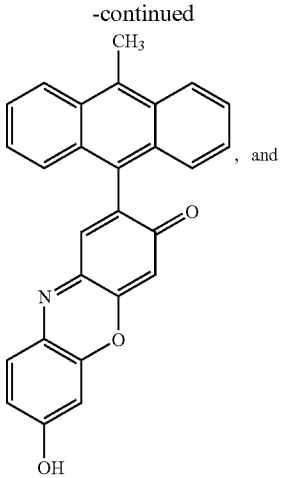, and

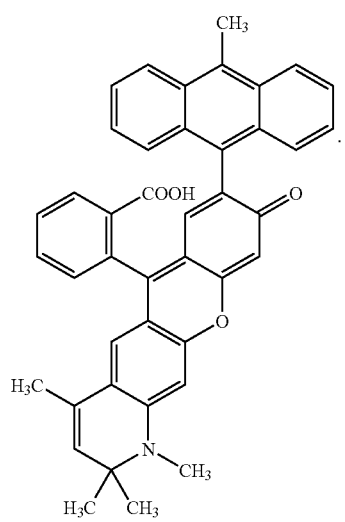

In a further exemplary embodiment, the invention provides compounds having the formula:

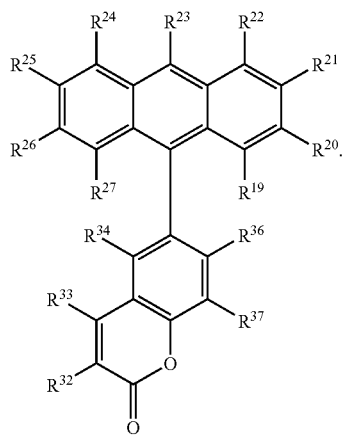

In another exemplary embodiment, $R^{32}$, $R^{34}$, and $R^{37}$ are H. In yet another exemplary embodiment, $R^{36}$ is —OH and $R^{33}$ is —CH$_3$.

In an exemplary embodiment, the compound is:

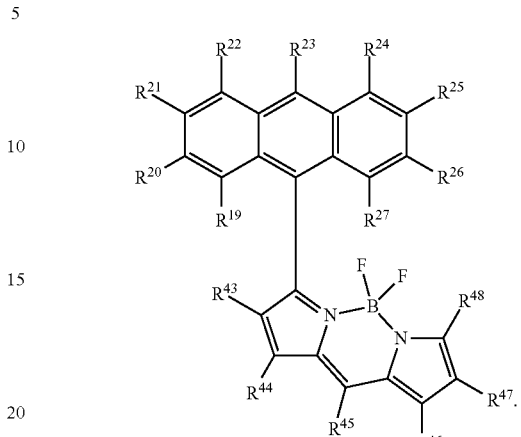

In another exemplary embodiment, $R^{43}$, $R^{44}$, $R^{45}$, and $R^{47}$ are H. In yet another exemplary embodiment, $R^{46}$ and $R^{48}$ are —CH$_3$.

In another exemplary embodiment, the compounds of the invention are fluorescent, due to the covalent bonding of singlet oxygen to the oxidizable moiety. In this embodiment, the oxidizable moiety has been oxidized and is anthracene endoperoxide, which has the following forula:

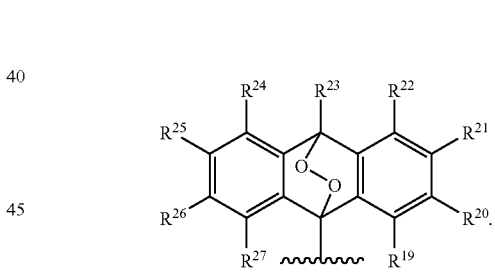

In this embodiment, $R^{19}$, $R^{20}$, $R^{21}$, $R^{22}$, $R^{23}$, $R^{24}$, $R^{25}$, $R^{26}$ and $R^{27}$ are independently selected from H, halogen, —SO$_2$R$^{12}$, substituted or unsubstituted C$_1$-C$_{18}$ alkyl, substituted or unsubstituted C$_1$-C$_{18}$ heteroalkyl, substituted or unsubstituted C$_1$-C$_{18}$ cycloalkyl, substituted or unsubstituted C$_1$-C$_{18}$ heterocycloalkyl, substituted or unsubstituted C$_1$-C$_{18}$ aryl, substituted or unsubstituted C$_1$-C$_{18}$ heteroaryl, a reactive group, and a carrier molecule. The symbol R$^{12}$ represents H, —OH, —NH$_2$, substituted or unsubstituted C$_1$-C$_{18}$ alkyl, substituted or unsubstituted C$_1$-C$_{18}$ heteroalkyl, substituted or unsubstituted C$_1$-C$_{18}$ cycloalkyl, substituted or unsubstituted C$_1$-C$_{18}$ heterocycloalkyl, substituted or unsubstituted C$_1$-C$_{18}$ aryl, and substituted or unsubstituted C$_1$-C$_{18}$ heteroaryl.

In an exemplary embodiment, the compound has a formula which is a member selected from:

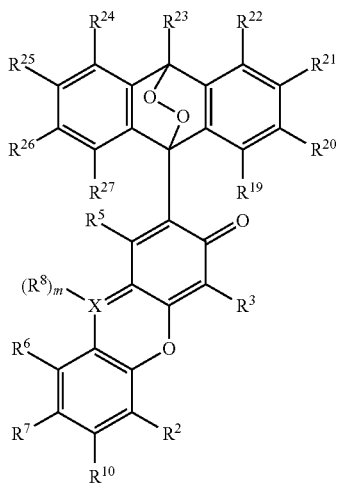

and

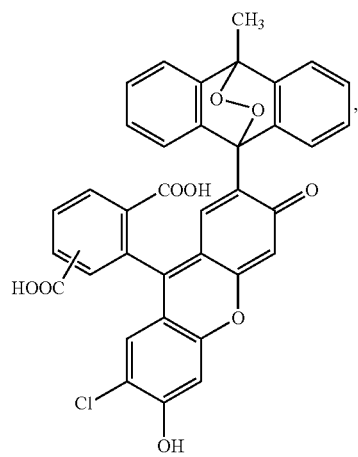

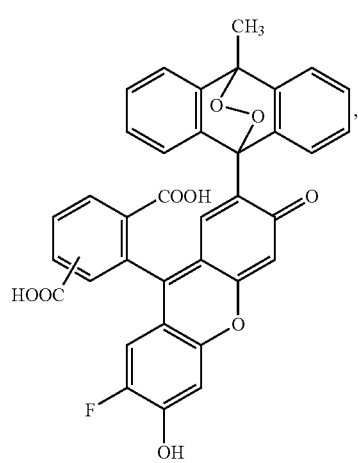

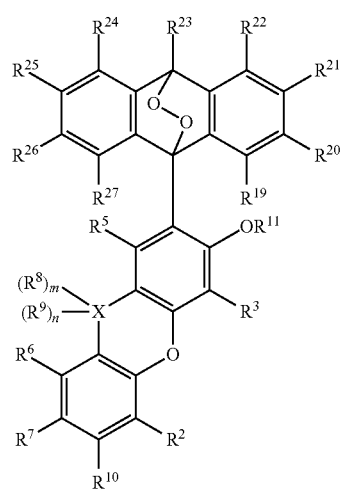

in which the substituents are identical to those described in the generic formulae for the corresponding unoxidized compounds.

In another exemplary embodiment, $R^2$, $R^3$, $R^5$, and $R^6$ are H. In another exemplary embodiment, the compound has a formula which is a member selected from:

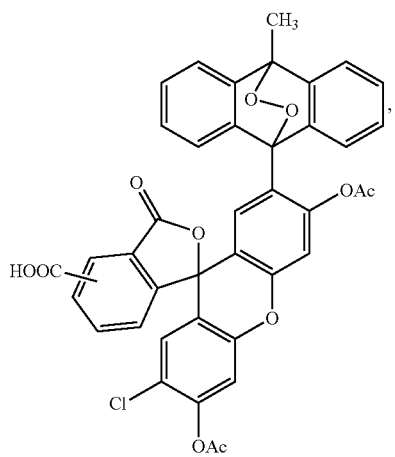

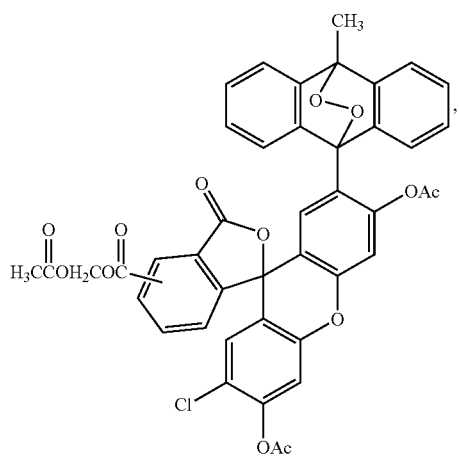

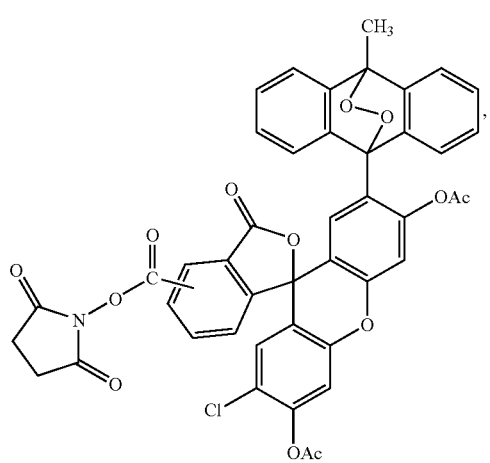

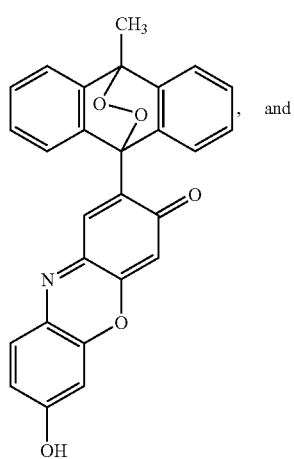

, and

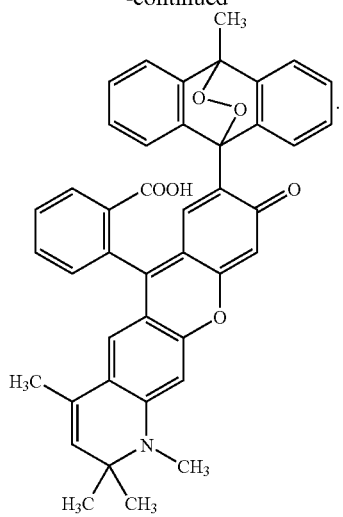

In still another exemplary embodiment, the compound is:

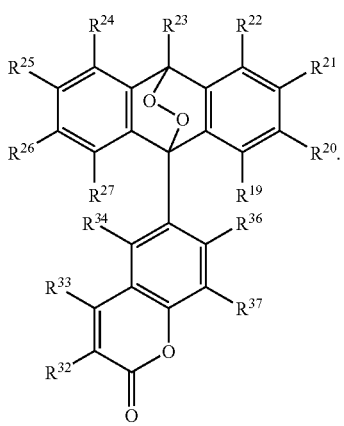

In the formula above, the substituents are identical to those described in the context of the corresponding non-oxidized compound.

In another exemplary embodiment, $R^{32}$, $R^{34}$, and $R^{37}$ are H. In yet another exemplary embodiment, $R^{36}$ is —OH and $R^{33}$ is —CH$_3$.

In yet another exemplary embodiment, the compound is:

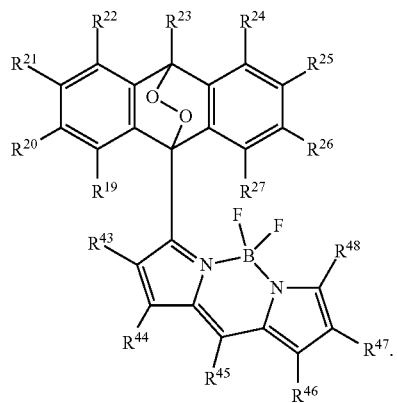

In the formula above, the identity of the substituents is identical to those disclosed in the context of the corresponding un-oxidized compound.

In another exemplary embodiment, $R^{43}$, $R^{44}$, $R^{45}$, and $R^{47}$ are H. In yet another exemplary embodiment, $R^{46}$ and $R^{48}$ are —$CH_3$.

Reactive Groups, Carrier Molecules and Solid Supports

The present compounds, in certain embodiments, are chemically reactive wherein the compounds comprise a reactive group. In a further embodiment, the compounds comprise a carrier molecule or solid support. These substituents, reactive groups, carrier molecules, and solid supports, comprise a linker that is used to covalently attach the substituents to any of the moieties of the present compounds. The solid support, carrier molecule or reactive group may be directly attached (where linker is a single bond) to the moieties or attached through a series of stable bonds.

Any combination of linkers may be used to attach the carrier molecule, solid support or reactive group and the present compounds together. The linker may also be substituted to alter the physical properties of the fluorogenic compound, such as spectral properties of the dye.

The linker typically incorporates 1-30 nonhydrogen atoms selected from the group consisting of C, N, O, S and P. The linker may be any combination of stable chemical bonds, optionally including, single, double, triple or aromatic carbon-carbon bonds, as well as carbon-nitrogen bonds, nitrogen-nitrogen bonds, carbon-oxygen bonds, sulfur-sulfur bonds, carbon-sulfur bonds, phosphorus-oxygen bonds, phosphorus-nitrogen bonds, and nitrogen-platinum bonds. Typically the linker incorporates less than 15 nonhydrogen atoms and are composed of any combination of ether, thioether, thiourea, amine, ester, carboxamide, sulfonamide, hydrazide bonds and aromatic or heteroaromatic bonds. Typically the linker is a combination of single carbon-carbon bonds and carboxamide, sulfonamide or thioether bonds. The bonds of the linker typically result in the following moieties that can be found in the linker: ether, thioether, carboxamide, thiourea, sulfonamide, urea, urethane, hydrazine, alkyl, aryl, heteroaryl, alkoxy, cycloalkyl and amine moieties. Examples of a linker include substituted or unsubstituted polymethylene, arylene, alkylarylene, arylenealkyl, and arylthio.

In one embodiment, the linker contains 1-6 carbon atoms; in another, the linker comprises a thioether linkage. Exemplary linking members include a moiety that includes —C(O)NH—, —C(O)O—, —NH—, —S—, —O—, and the like. In another embodiment, the linker is or incorporates the formula —(CH$_2$)$_d$(CONH(CH$_2$)$_e$)$_z$— or where d is an integer from 0-5, e is an integer from 1-5 and z is 0 or 1. In a further embodiment, the linker is or incorporates the formula —O—(CH$_2$)—. In yet another embodiment, the linker is or incorporates a phenylene or a 2-carboxy-substituted phenylene.

An important feature of the linker is to provide an adequate space between the carrier molecule, reactive group or solid support and the dye so as to prevent steric hinderance. Therefore, the linker of the present compound is important for (1) attaching the carrier molecule, reactive group or solid support to the compound, (2) providing an adequate space between the carrier molecule, reactive group or solid support and the compound so as not to sterically hinder the action of the compound and (3) for altering the physical properties of the present compounds.

In another exemplary embodiment of the invention, the present compounds are chemically reactive, and are substituted by at least one reactive group. The reactive group functions as the site of attachment for another moiety, such as a carrier molecule or a solid support, wherein the reactive group chemically reacts with an appropriate reactive or functional group on the carrier molecule or solid support.

In an exemplary embodiment, the compounds of the invention further comprise a reactive group which is a member selected from an acrylamide, an activated ester of a carboxylic acid, a carboxylic ester, an acyl azide, an acyl nitrile, an aldehyde, an alkyl halide, an anhydride, an aniline, an amine, an aryl halide, an azide, an aziridine, a boronate, a diazoalkane, a haloacetamide, a haloalkyl, a halotriazine, a hydrazine, an imido ester, an isocyanate, an isothiocyanate, a maleimide, a phosphoramidite, a photoactivatable group, a reactive platinum complex, a silyl halide, a sulfonyl halide, and a thiol. In a particular embodiment the reactive group is selected from the group consisting of carboxylic acid, succinimidyl ester of a carboxylic acid, hydrazide, amine and a maleimide. In exemplary embodiment, at least one member selected from $R^2$, $R^3$, $R^4$, $R^5$, $R^6$, $R^7$, $R^8$, and $R^9$ is a reactive group. Alternatively, the reactive group is bound to one of the aromatic carbons of the heterocycle ring systems formed when $R^9$ in combination with $R^{10}$, or $R^{10}$ in combination with one of $R^2$ or $R^7$; or $R^{11}$ in combination with one of $R^4$ or $R^5$ forms a saturated or unsaturated 5- or 6-membered heterocycle. In an exemplary embodiment, the reactive group is bound to the compound of the invention at $R^2$, $R^3$, $R^4$, $R^5$, $R^6$ or $R^7$. In another exemplary embodiment, the reactive group is bound to the dye moiety at $R^2$, $R^3$, $R^4$, $R^5$, or $R^7$. Alternatively, if the present compound comprises a carrier molecule or solid support a reactive group may be covalently attached independently to those substituents, allowing for further conjugation to a another dye, carrier molecule or solid support.

In one aspect, the compound comprises at least one reactive group that selectively reacts with an amine group. This amine-reactive group is selected from the group consisting of succinimidyl ester, sulfonyl halide, tetrafluorophenyl ester and iosothiocyanates. Thus, in one aspect, the present compounds form a covalent bond with an amine-containing molecule in a sample. In another aspect, the compound comprises at least one reactive group that selectively reacts with a thiol group. This thiol-reactive group is selected from the group consisting of maleimide, haloalkyl and haloacetamide (including any reactive groups disclosed in U.S. Pat. Nos. 5,362,628; 5,352,803 and 5,573,904).

These reactive groups are synthesized during the formation of the dye and anthracene-containing compounds to provide dye, anthracene, and reactive group-containing compounds. In this way, compounds incorporating a reactive group can be covalently attached to a wide variety of carrier molecules or solid supports that contain or are modified to contain functional groups with suitable reactivity, resulting in chemical attachment of the components. In an exemplary embodiment, the reactive group of the compounds of the invention and the functional group of the carrier molecule of solid support comprise electrophiles and nucleophiles that can generate a covalent linkage between them. Alternatively, the reactive group comprises a photoactivatable group, which becomes chemically reactive only after illumination with light of an appropriate wavelength. Typically, the conjugation reaction between the reactive group and the carrier molecule/solid support results in one or more atoms of the reactive group being incorporated into a new linkage attaching the dye/anthracene compound of the invention to the carrier molecule/solid support. Selected examples of functional groups and linkages are shown in Table 1, where the reaction of an electrophilic group and a nucleophilic group yields a covalent linkage.

TABLE 1

Examples of some routes to useful covalent linkages

| Electrophilic Group | Nucleophilic Group | Resulting Covalent Linkage |
|---|---|---|
| activated esters* | amines/anilines | carboxamides |
| acrylamides | thiols | thioethers |
| acyl azides** | amines/anilines | carboxamides |
| acyl halides | amines/anilines | carboxamides |
| acyl halides | alcohols/phenols | esters |
| acyl nitriles | alcohols/phenols | esters |
| acyl nitriles | amines/anilines | carboxamides |
| aldehydes | amines/anilines | imines |
| aldehydes or ketones | hydrazines | hydrazones |
| aldehydes or ketones | hydroxylamines | oximes |
| alkyl halides | amines/anilines | alkyl amines |
| alkyl halides | carboxylic acids | esters |
| alkyl halides | thiols | thioethers |
| alkyl halides | alcohols/phenols | ethers |
| alkyl sulfonates | thiols | thioethers |
| alkyl sulfonates | carboxylic acids | esters |
| alkyl sulfonates | alcohols/phenols | ethers |
| anhydrides | alcohols/phenols | esters |
| anhydrides | amines/anilines | carboxamides |
| aryl halides | thiols | thiophenols |
| aryl halides | amines | aryl amines |
| aziridines | thiols | thioethers |
| boronates | glycols | boronate esters |
| carbodiimides | carboxylic acids | N-acylureas or anhydrides |
| diazoalkanes | carboxylic acids | esters |
| epoxides | thiols | thioethers |
| haloacetamides | thiols | thioethers |
| haloplatinate | amino | platinum complex |
| haloplatinate | heterocycle | platinum complex |
| haloplatinate | thiol | platinum complex |
| halotriazines | amines/anilines | aminotriazines |
| halotriazines | alcohols/phenols | triazinyl ethers |
| halotriazines | thiols | triazinyl thioethers |
| imido esters | amines/anilines | amidines |
| isocyanates | amines/anilines | ureas |
| isocyanates | alcohols/phenols | urethanes |
| isothiocyanates | amines/anilines | thioureas |
| maleimides | thiols | thioethers |
| phosphoramidites | alcohols | phosphite esters |
| silyl halides | alcohols | silyl ethers |
| sulfonate esters | amines/anilines | alkyl amines |
| sulfonate esters | thiols | thioethers |
| sulfonate esters | carboxylic acids | esters |
| sulfonate esters | alcohols | ethers |
| sulfonyl halides | amines/anilines | sulfonamides |
| sulfonyl halides | phenols/alcohols | sulfonate esters |

*Activated esters, as understood in the art, generally have the formula —COΩ, where Ω is a good leaving group (e.g., succinimidyloxy (—OC$_4$H$_4$O$_2$) sulfosuccinimidyloxy (—OC$_4$H$_3$O$_2$—SO$_3$H), -1-oxybenzotriazolyl (—OC$_6$H$_4$N$_3$); or an aryloxy group or aryloxy substituted one or more times by electron withdrawing substituents such as nitro, fluoro, chloro, cyano, or trifluoromethyl, or combinations thereof, used to form activated aryl esters; or a carboxylic acid activated by a carbodiimide to form an anhydride or mixed anhydride —OCOR$^a$ or —OCNR$^a$NHR$^b$, where R$^a$ and R$^b$, which may be the same or different, are C$_1$-C$_6$ alkyl, C$_1$-C$_6$ perfluoroalkyl, or C$_1$-C$_6$ alkoxy; or cyclohexyl, 3-dimethylaminopropyl, or N-morpholinoethyl).

**Acyl azides can also rearrange to isocyanates

Choice of the reactive group used to attach the compound of the invention to the substance to be conjugated typically depends on the reactive or functional group on the substance to be conjugated and the type or length of covalent linkage desired. The types of functional groups typically present on the organic or inorganic substances (biomolecule or non-biomolecule) include, but are not limited to, amines, amides, thiols, alcohols, phenols, aldehydes, ketones, phosphates, imidazoles, hydrazines, hydroxylamines, disubstituted amines, halides, epoxides, silyl halides, carboxylate esters, sulfonate esters, purines, pyrimidines, carboxylic acids, olefinic bonds, or a combination of these groups. A single type of reactive site may be available on the substance (typical for polysaccharides or silica), or a variety of sites may occur (e.g., amines, thiols, alcohols, phenols), as is typical for proteins.

Typically, the reactive group will react with an amine, a thiol, an alcohol, an aldehyde, a ketone, or with silica. Preferably, reactive groups react with an amine or a thiol functional group, or with silica. In one embodiment, the reactive group is an acrylamide, an activated ester of a carboxylic acid, an acyl azide, an acyl nitrile, an aldehyde, an alkyl halide, a silyl halide, an anhydride, an aniline, an aryl halide, an azide, an aziridine, a boronate, a diazoalkane, a haloacetamide, a halotriazine, a hydrazine (including hydrazides), an imido ester, an isocyanate, an isothiocyanate, a maleimide, a phosphoramidite, a reactive platinum complex, a sulfonyl halide, or a thiol group. By "reactive platinum complex" is particularly meant chemically reactive platinum complexes such as described in U.S. Pat. No. 5,714,327.

Where the reactive group is an activated ester of a carboxylic acid, such as a succinimidyl ester of a carboxylic acid, a sulfonyl halide, a tetrafluorophenyl ester or an isothiocyanates, the resulting compound is particularly useful for preparing conjugates of carrier molecules such as proteins, nucleotides, oligonucleotides, or haptens. Where the reactive group is a maleimide, haloalkyl or haloacetamide (including any reactive groups disclosed in U.S. Pat. Nos. 5,362,628; 5,352,803 and 5,573,904 (supra)) the resulting compound is particularly useful for conjugation to thiol-containing substances. Where the reactive group is a hydrazide, the resulting compound is particularly useful for conjugation to periodate-oxidized carbohydrates and glycoproteins, and in addition is an aldehyde-fixable polar tracer for cell microinjection. Where the reactive group is a silyl halide, the resulting compound is particularly useful for conjugation to silica surfaces, particularly where the silica surface is incorporated into a fiber optic probe subsequently used for remote ion detection or quantitation.

In a particular aspect, the reactive group is a photoactivatable group such that the group is only converted to a reactive species after illumination with an appropriate wavelength. An appropriate wavelength is generally a UV wavelength that is less than 400 nm. This method provides for specific attachment to only the target molecules, either in solution or immobilized on a solid or semi-solid matrix. Photoactivatable reactive groups include, without limitation, benzophenones, aryl azides and diazirines.

Preferably, the reactive group is, a photoactivatable group, succinimidyl ester of a carboxylic acid, a haloacetamide, haloalkyl, a hydrazine, an isothiocyanate, a maleimide group, an aliphatic amine, a silyl halide, a cadaverine or a psoralen. More preferably, the reactive group is a succinimidyl ester of a carboxylic acid, a maleimide, an iodoacetamide, or a silyl halide. In a particular embodiment the reactive group is a succinimidyl ester of a carboxylic acid, a sulfonyl halide, a tetrafluorophenyl ester, an iosothiocyanates or a maleimide.

In an exemplary embodiment, the dye/anthracene compound is covalently bound to a carrier molecule. The carrier molecule can be attached to the compound through either the dye moiety or the anthracene moiety. If the compound has a reactive group, then the carrier molecule can alternatively be linked to the compound through the reactive group. The reactive group may contain both a reactive functional moiety and a linker, or only the reactive functional moiety.

A variety of carrier molecules are useful in the present invention. Exemplary carrier molecules include antigens, steroids, vitamins, drugs, haptens, metabolites, toxins, environmental pollutants, amino acids, peptides, proteins, nucleic acids, nucleic acid polymers, carbohydrates, lipids, and polymers. In exemplary embodiment, at least one member selected from $R^2$, $R^3$, $R^4$, $R^5$, $R^6$, $R^7$, $R^8$, and $R^9$ is a carrier molecule. Alternatively, the carrier molecule is bound to one of the aromatic carbons of the heterocycle ring systems formed when $R^9$ in combination with $R^{10}$, or $R^{10}$ in combination with one of $R^2$ or $R^7$; or $R^{11}$ in combination with one of $R^4$ or $R^5$ forms a saturated or unsaturated 5- or 6-membered heterocycle. In an exemplary embodiment, the carrier molecule is bound to the compound of the invention at $R^2$, $R^3$, $R^4$, $R^5$, $R^6$ or $R^7$. In another exemplary embodiment, the carrier molecule is bound to the dye moiety at $R^2$, $R^3$, $R^4$, $R^5$, or $R^7$. Alternatively, if the present compound comprises a reactive group or solid support a reactive group may be covalently attached independently to those substituents, allowing for further conjugation to a reactive group, carrier molecule or solid support.

In an exemplary embodiment, the carrier molecule comprises an amino acid, a peptide, a protein, a polysaccharide, a nucleoside, a nucleotide, an oligonucleotide, a nucleic acid, a hapten, a psoralen, a drug, a hormone, a lipid, a lipid assembly, a synthetic polymer, a polymeric microparticle, a biological cell, a virus and combinations thereof. In another exemplary embodiment, the carrier molecule is selected from a hapten, a nucleotide, an oligonucleotide, a nucleic acid polymer, a protein, a peptide or a polysaccharide. In a preferred embodiment the carrier molecule is amino acid, a peptide, a protein, a polysaccharide, a nucleoside, a nucleotide, an oligonucleotide, a nucleic acid, a hapten, a psoralen, a drug, a hormone, a lipid, a lipid assembly, a tyramine, a synthetic polymer, a polymeric microparticle, a biological cell, cellular components, an ion chelating moiety, an enzymatic substrate or a virus. In another preferred embodiment, the carrier molecule is an antibody or fragment thereof, an antigen, an avidin or streptavidin, a biotin, a dextran, an antibody binding protein, a fluorescent protein, agarose, and a non-biological microparticle. Typically, the carrier molecule is an antibody, an antibody fragment, antibody-binding proteins, avidin, streptavidin, a toxin, a lectin, or a growth factor. Preferred haptens include biotin, digoxigenin and fluorophores.

Antibody binging proteins include, but are not limited to, protein A, protein G, soluble Fc receptor, protein L, lectins, anti-IgG, anti-IgA, anti-IgM, anti-IgD, anti-IgE or a fragment thereof.

In an exemplary embodiment, the enzymatic substrate is selected from an amino acid, peptide, sugar, alcohol, alkanoic acid, 4-guanidinobenzoic acid, nucleic acid, lipid, sulfate, phosphate, —$CH_2OCOalkyl$ and combinations thereof. Thus, the enzyme substrates can be cleave by enzymes selected from the group consisting of peptidase, phosphatase, glycosidase, dealkylase, esterase, guanidinobenzotase, sulfatase, lipase, peroxidase, histone deacetylase, endoglycoceramidase, exonuclease, reductase and endonuclease.

In another exemplary embodiment, the carrier molecule is an amino acid (including those that are protected or are substituted by phosphates, carbohydrates, or $C_1$ to $C_{22}$ carboxylic acids), or a polymer of amino acids such as a peptide or protein. In a related embodiment, the carrier molecule contains at least five amino acids, more preferably 5 to 36 amino acids. Exemplary peptides include, but are not limited to, neuropeptides, cytokines, toxins, protease substrates, and protein kinase substrates. Other exemplary peptides may function as organelle localization peptides, that is, peptides that serve to target the conjugated compound for localization within a particular cellular substructure by cellular transport mechanisms. Preferred protein carrier molecules include enzymes, antibodies, lectins, glycoproteins, histones, albumins, lipoproteins, avidin, streptavidin, protein A, protein G, phycobiliproteins and other fluorescent proteins, hormones, toxins and growth factors. Typically, the protein carrier molecule is an antibody, an antibody fragment, avidin, streptavidin, a toxin, a lectin, or a growth factor. Exemplary haptens include biotin, digoxigenin and fluorophores.

In another exemplary embodiment, the carrier molecule comprises a nucleic acid base, nucleoside, nucleotide or a nucleic acid polymer, optionally containing an additional linker or spacer for attachment of a fluorophore or other ligand, such as an alkynyl linkage (U.S. Pat. No. 5,047,519), an aminoallyl linkage (U.S. Pat. No. 4,711,955) or other linkage. In another exemplary embodiment, the nucleotide carrier molecule is a nucleoside or a deoxynucleoside or a dideoxynucleoside.

Exemplary nucleic acid polymer carrier molecules are single- or multi-stranded, natural or synthetic DNA or RNA oligonucleotides, or DNA/RNA hybrids, or incorporating an unusual linker such as morpholine derivatized phosphates (AntiVirals, Inc., Corvallis Oreg.), or peptide nucleic acids such as N-(2-aminoethyl)glycine units, where the nucleic acid contains fewer than 50 nucleotides, more typically fewer than 25 nucleotides.

In another exemplary embodiment, the carrier molecule comprises a carbohydrate or polyol that is typically a polysaccharide, such as dextran, FICOLL, heparin, glycogen, amylopectin, mannan, inulin, starch, agarose and cellulose, or is a polymer such as a poly(ethylene glycol). In a related embodiment, the polysaccharide carrier molecule includes dextran, agarose or FICOLL.

In another exemplary embodiment, the carrier molecule comprises a lipid (typically having 6-25 carbons), including glycolipids, phospholipids, and sphingolipids. Alternatively, the carrier molecule comprises a lipid vesicle, such as a liposome, or is a lipoprotein (see below). Some lipophilic substituents are useful for facilitating transport of the conjugated dye into cells or cellular organelles.

Alternatively, the carrier molecule is cells, cellular systems, cellular fragments, or subcellular particles. Examples of this type of conjugated material include virus particles, bacterial particles, virus components, biological cells (such as animal cells, plant cells, bacteria, or yeast), or cellular components. Examples of cellular components that can be labeled, or whose constituent molecules can be labeled, include but are not limited to lysosomes, endosomes, cytoplasm, nuclei, histones, mitochondria, Golgi apparatus, endoplasmic reticulum and vacuoles.

In another embodiment the carrier molecule is a metal chelating moiety. While any chelator that binds a metal ion of interest and gives a change in its fluorescence properties is a suitable conjugate, preferred metal chelating moieties are crown ethers, including diaryldiaza crown ethers, as described in U.S. Pat. No. 5,405,975 to Kuhn et al. (1995); derivatives of 1,2-bis-(2-aminophenoxyethane)-N,N,N',N'-tetraacetic acid (BAPTA), as described in U.S. Pat. No. 5,453,517 to Kuhn et al. (1995) (incorporated by reference) and U.S. Pat. No. 5,049,673 to Tsien et al. (1991); derivatives of 2-carboxymethoxy-aniline-N,N-diacetic acid (APTRA), as described by Ragu et al., Am. J. Physiol., 256: C540 (1989); and pyridyl-based and phenanthroline metal ion chelators, as described in U.S. Pat. No. 5,648,270 to Kuhn et al. (1997).

Fluorescent conjugates of metal chelating moieties possess utility as indicators for the presence of a desired metal ion. While fluorescent ion-indicators are known in the art, the incorporation of the fluorinated fluorogenic and fluorescent compounds of the present invention imparts the highly advantageous properties of the instant fluorophores onto the resulting ion indicator.

The ion-sensing conjugates of the invention are optionally prepared in chemically reactive forms and further conjugated to polymers such as dextrans to improve their utility as sensors as described in U.S. Pat. Nos. 5,405,975 and 5,453,517.

In another exemplary embodiment, the carrier molecule non-covalently associates with organic or inorganic materials. Exemplary embodiments of the carrier molecule that possess a lipophilic substituent can be used to target lipid assemblies such as biological membranes or liposomes by non-covalent incorporation of the dye compound within the membrane, e.g., for use as probes for membrane structure or for incorporation in liposomes, lipoproteins, films, plastics, lipophilic microspheres or similar materials.

In an exemplary embodiment, the carrier molecule comprises a specific binding pair member wherein the present compounds are conjugated to a specific binding pair member and are used to detect an analyte in a sample. Alternatively, the presence of the labeled specific binding pair member indicates the location of the complementary member of that specific binding pair; each specific binding pair member having an area on the surface or in a cavity which specifically binds to, and is complementary with, a particular spatial and polar organization of the other. Exemplary binding pairs are set forth in Table 2.

TABLE 2

Representative Specific Binding Pairs

| antigen | antibody |
| --- | --- |
| biotin | avidin (or streptavidin or anti-biotin) |
| IgG* | protein A or protein G |
| drug | drug receptor |
| folate | folate binding protein |
| toxin | toxin receptor |
| carbohydrate | lectin or carbohydrate receptor |
| peptide | peptide receptor |
| protein | protein receptor |
| enzyme substrate | enzyme |
| DNA (RNA) | cDNA (cRNA)† |
| hormone | hormone receptor |
| ion | chelator |
| antibody | antibody-binding proteins |

*IgG is an immunoglobulin
†cDNA and cRNA are the complementary strands used for hybridization In an exemplary embodiment, the present compounds of the invention are covalently bonded to a solid support. The solid support may be attached to the compound or through a reactive group, if present, or through a carrier molecule, if present. Even if a reactive group and/or a carrier molecule are present, the solid support may be attached through $R^2$, $R^3$, $R^4$, $R^5$, $R^6$, $R^7$, $R^8$, and $R^9$ is a reactive group. Alternatively, the solid support is bound to one of the aromatic carbons of the heterocycle ring systems formed when $R^9$ in combination with $R^{10}$, or $R^{10}$ in combination with one of $R^2$ or $R^7$; or $R^{11}$ in combination with one of $R^4$ or $R^5$ forms a saturated or unsaturated 5- or 6-membered heterocycle. In an exemplary embodiment, the solid support is bound to the compound of the invention at $R^2$, $R^3$, $R^4$, $R^5$, $R^6$ or $R^7$. In another exemplary embodiment, the solid support is bound to the dye moiety at $R^2$, $R^3$, $R^4$, $R^5$, or $R^7$. Alternatively, if the present compound comprises a carrier molecule or reactive group a solid support may be covalently attached independently to those substituents, allowing for further conjugation to a another dye, carrier molecule or solid support.

A solid support suitable for use in the present invention is typically substantially insoluble in liquid phases. Solid supports of the current invention are not limited to a specific type of support. Rather, a large number of supports are available and are known to one of ordinary skill in the art. Thus, useful solid supports include solid and semi-solid matrixes, such as aerogels and hydrogels, resins, beads, biochips (including thin film coated biochips), microfluidic chip, a silicon chip, multi-well plates (also referred to as microtitre plates or microplates), membranes, conducting and nonconducting metals, glass (including microscope slides) and magnetic supports. More specific examples of useful solid supports include silica gels, polymeric membranes, particles, derivatized plastic films, glass beads, cotton, plastic beads, alumina gels, polysaccharides such as Sepharose, poly(acrylate), polystyrene, poly(acrylamide), polyol, agarose, agar, cellulose, dextran, starch, FICOLL, heparin, glycogen, amylopectin, mannan, inulin, nitrocellulose, diazocellulose, polyvinylchloride, polypropylene, polyethylene (including poly (ethylene glycol)), nylon, latex bead, magnetic bead, paramagnetic bead, superparamagnetic bead, starch and the like.

In some embodiments, the solid support may include a solid support reactive functional group, including, but not limited to, hydroxyl, carboxyl, amino, thiol, aldehyde, halogen, nitro, cyano, amido, urea, carbonate, carbamate, isocyanate, sulfone, sulfonate, sulfonamide, sulfoxide, etc., for attaching the compounds of the invention. Useful reactive groups are disclosed above and are equally applicable to the solid support reactive functional groups herein.

A suitable solid phase support can be selected on the basis of desired end use and suitability for various synthetic protocols. For example, where amide bond formation is desirable to attach the compounds of the invention to the solid support, resins generally useful in peptide synthesis may be employed, such as polystyrene (e.g., PAM-resin obtained from Bachem Inc., Peninsula Laboratories, etc.), POLYHIPE™ resin (obtained from Aminotech, Canada), polyamide resin (obtained from Peninsula Laboratories), polystyrene resin grafted with polyethylene glycol (TentaGel™, Rapp Polymere, Tubingen, Germany), polydimethyl-acrylamide resin (available from Milligen/Biosearch, California), or PEGA beads (obtained from Polymer Laboratories).

Preparation of Conjugates

Conjugates of components (carrier molecules or solid supports), e.g., drugs, peptides, toxins, nucleotides, phospholipids and other organic molecules are prepared by organic synthesis methods using the reactive reporter molecules of the invention, are generally prepared by means well recognized in the art (Haugland, MOLECULAR PROBES HANDBOOK, supra, (2002)). Preferably, conjugation to form a covalent bond consists of simply mixing the reactive compounds of the present invention in a suitable solvent in which both the reactive compound and the substance to be conjugated are soluble. The reaction preferably proceeds spontaneously without added reagents at room temperature or below.

For those reactive compounds that are photoactivated, conjugation is facilitated by illumination of the reaction mixture to activate the reactive compound. Chemical modification of water-insoluble substances, so that a desired compound-conjugate may be prepared, is preferably performed in an aprotic solvent such as dimethylformamide, dimethylsulfoxide, acetone, ethyl acetate, toluene, or chloroform. Similar modification of water-soluble materials is readily accomplished through the use of the instant reactive compounds to make them more readily soluble in organic solvents.

Preparation of Peptide or Protein Conjugates Typically Comprises First Dissolving the Protein to be conjugated in aqueous buffer at about. 1-10 mg/mL at room temperature or below. Bicarbonate buffers (pH about 8.3) are especially suitable for reaction with succinimidyl esters, phosphate buffers (pH about 7.2-8) for reaction with thiol-reactive functional groups and carbonate or borate buffers (pH about 9) for reaction with isothiocyanates and dichlorotriazines. The appropriate reactive compound is then dissolved in an aprotic solvent (usually DMSO or DMF) in an amount sufficient to give a suitable degree of labeling when added to a solution of the protein to be conjugated. The appropriate amount of compound for any protein or other component is conveniently predetermined by experimentation in which variable amounts of the compound are added to the protein, the conjugate is chromatographically purified to separate unconjugated compound and the compound-protein conjugate is tested in its desired application.

Following addition of the reactive compound to the component solution, the mixture is incubated for a suitable period (typically about 1 hour at room temperature to several hours on ice), the excess compound is removed by gel filtration, dialysis, HPLC, adsorption on an ion exchange or hydrophobic polymer or other suitable means. The compound-conjugate is used in solution or lyophilized. In this way, suitable conjugates can be prepared from antibodies, antibody fragments, avidins, lectins, enzymes, proteins A and G, cellular proteins, albumins, histones, growth factors, hormones, and other proteins.

Conjugates of polymers, including biopolymers and other higher molecular weight polymers are typically prepared by means well recognized in the art (for example, Brinkley et al., Bioconjugate Chem., 3: 2 (1992)). In these embodiments, a single type of reactive site may be available, as is typical for polysaccharides) or multiple types of reactive sites (e.g. amines, thiols, alcohols, phenols) may be available, as is typical for proteins. Selectivity of labeling is best obtained by selection of an appropriate reactive dye. For example, modification of thiols with a thiol-selective reagent such as a haloacetamide or maleimide, or modification of amines with an amine-reactive reagent such as an activated ester, acyl azide, isothiocyanate or 3,5-dichloro-2,4,6-triazine. Partial selectivity can also be obtained by careful control of the reaction conditions.

When modifying polymers with the compounds, an excess of compound is typically used, relative to the expected degree of compound substitution. Any residual, unreacted compound or a compound hydrolysis product is typically removed by dialysis, chromatography or precipitation. Presence of residual, unconjugated dye can be detected by thin layer chromatography using a solvent that elutes the dye away from its conjugate. In all cases it is usually preferred that the reagents be kept as concentrated as practical so as to obtain adequate rates of conjugation.

In an exemplary embodiment, the conjugate of the invention is associated with an additional substance, that binds either to the reporter molecule or the conjugated substance (carrier molecule or solid support) through noncovalent interaction. In another exemplary embodiment, the additional substance is an antibody, an enzyme, a hapten, a lectin, a receptor, an oligonucleotide, a nucleic acid, a liposome, or a polymer. The additional substance is optionally used to probe for the location of the dye-conjugate, for example, as a means of enhancing the signal of the dye-conjugate.

Synthesis

The compounds of the invention are synthesized by an appropriate combination of generally well known synthetic methods. Techniques useful in synthesizing the compounds of the invention are both readily apparent and accessible to those of skill in the relevant art. The discussion below is offered to illustrate certain of the diverse methods available for use in assembling the compounds of the invention; it is not intended to define the scope of reactions or reaction sequences that are useful in preparing the compounds of the present invention.

a) Synthesis of Fluorescein-Containing Compounds

In Scheme 1, a general preparatory synthesis for a precursor to fluorescein-containing compounds of the invention is presented.

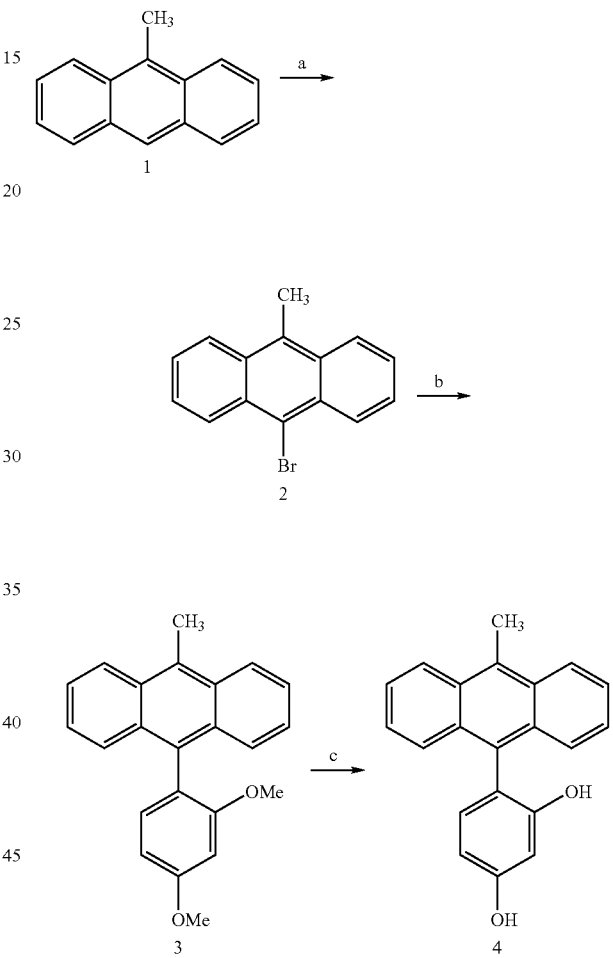

Alkyl anthracene 1 is brominated in CCl$_4$ in order to form 2 (reaction a). 2 is combined with 2,4-dimethyloxyphenyl boronic acid and tetrakis(triphenylphosphine)palladium in toluene to yield 3 (reaction b). The protecting groups are removed from 3 with BBr$_3$ in CH$_2$Cl$_2$ in order to form 4 (reaction c).

4 can be further reacted to form fluorescein compounds, as shown in Schemes 2-5. 4 can also be further reacted to form coumarin compounds, as shown in Scheme 6.

In Scheme 2, 4 is reacted with a mixture of 2,4-dicarboxy-5'-chloro-2',4'-dihydroxybenzophenone and 2,5-dicarboxy-5'-chloro-2',4'-dihydroxybenzophenone to produce 5 (reaction d).

Scheme 2

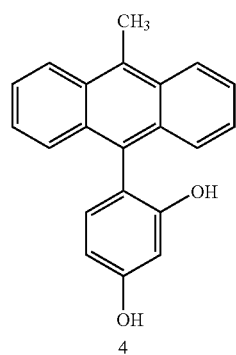
4

→ d

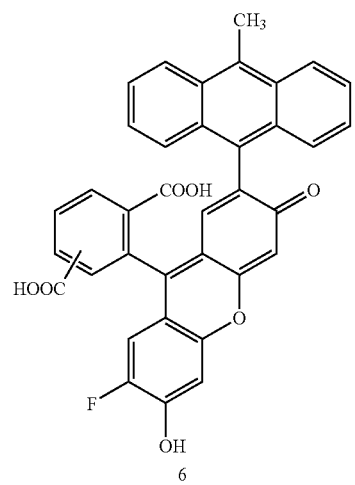
6

In Scheme 4, 4 is reacted with 4-nitrosoresocinol in concentrated sulfuric acid to produce 10 (reaction f).

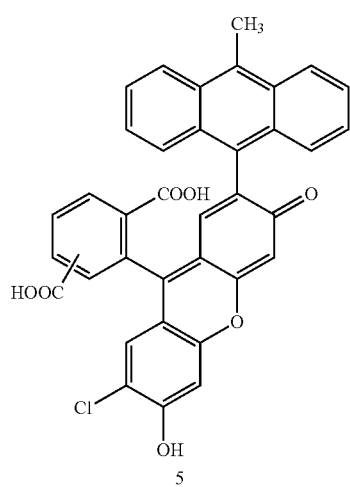
5

Scheme 4

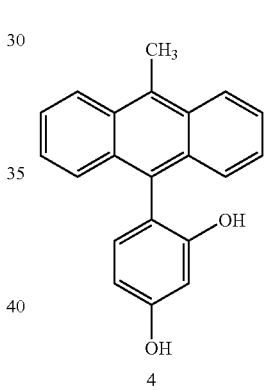
4

→ f

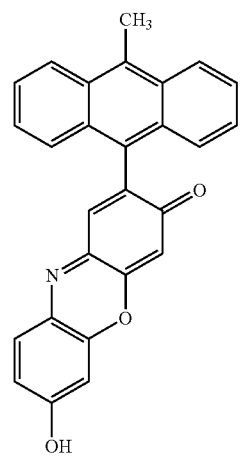
10

In Scheme 3, 4 is reacted with a mixture of 2,4-dicarboxy-5'-fluoro-2',4'-dihydroxybenzophenone and 2,5-dicarboxy-5'-fluoro-2',4'-dihydroxybenzophenone in methanesulfonic acid to produce 6 (reaction e).

In Scheme 5, 4 is reacted with aminophenol in methanesulfonic acid to produce 11 (reaction g).

Scheme 3

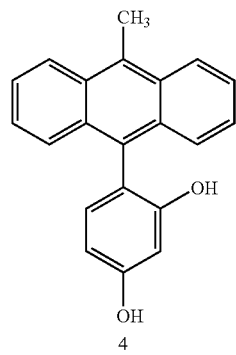
4

→ e

Scheme 5

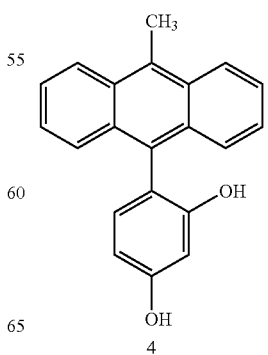
4

→ g

-continued

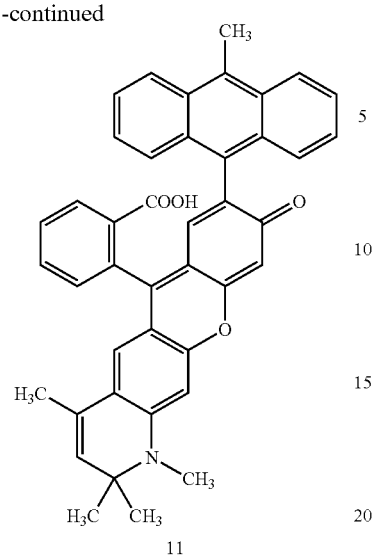
11

In Scheme 6, 4 is reacted with ethyl acetoacetate in methanesulfonic acid to produce 12 (reaction h).

Scheme 6

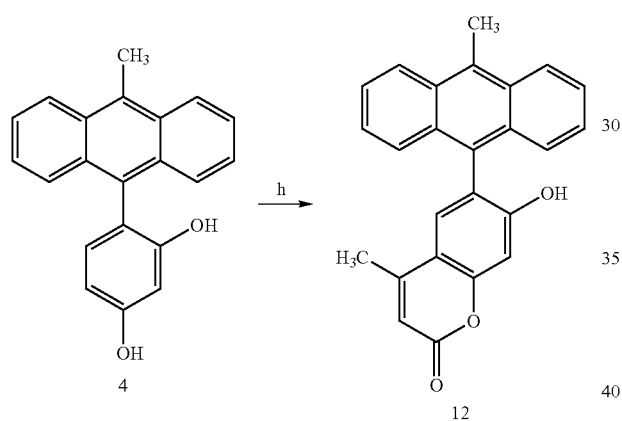

5 can be further reacted to form other flourescein compounds, as shown in Schemes 7-9.

In Scheme 7, 5 is reacted with triethylamine and acetic anhydride in DMF in order to produce 7.

Scheme 7

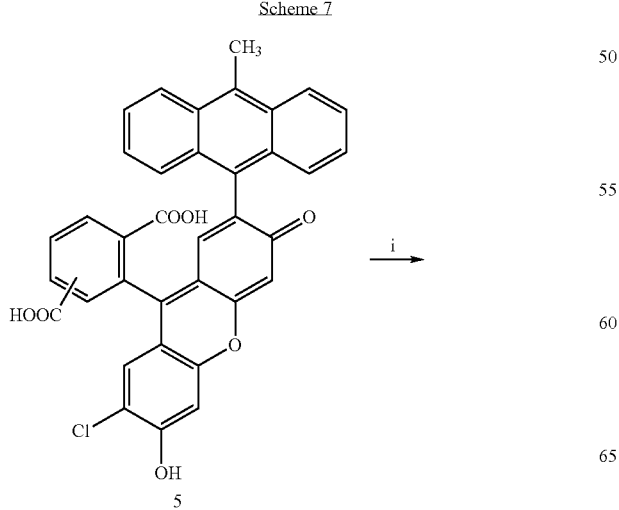
5

-continued

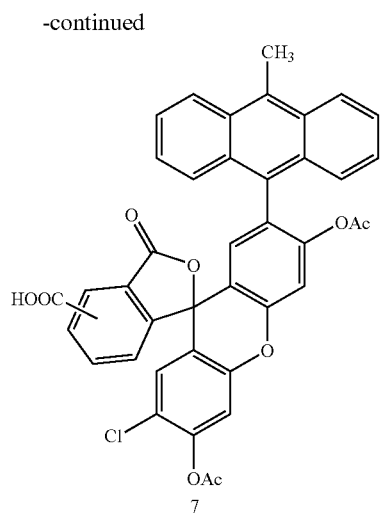
7

In Scheme 8, 7 is reacted with bromomethyl acetate and N,N-diisopropylethylamine in dry THF in order to produce 8.

Scheme 8

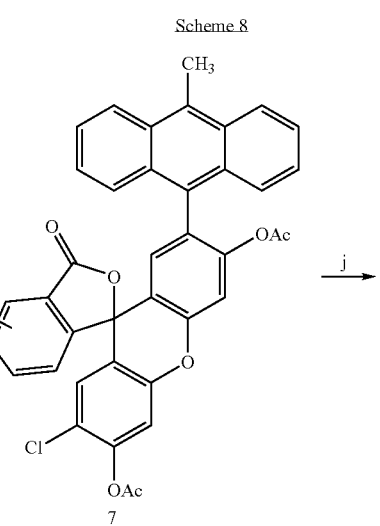
7

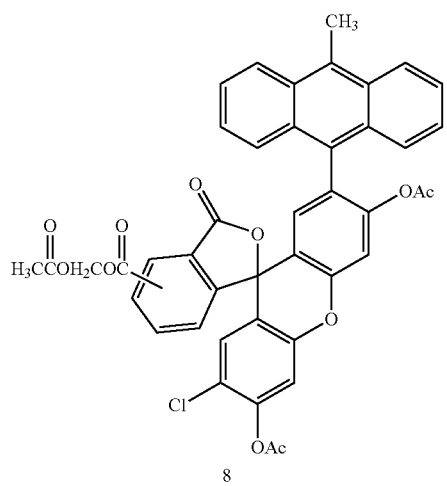
8

In Scheme 9, 7 in dry THF and dry pyridine is reacted with succinimidyl trifluoroacetate in order to produce 9.

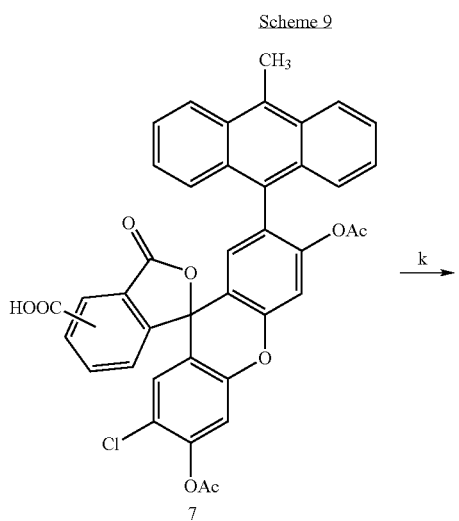

Scheme 9

Synthesis of BODIPY-Containing Compounds

In Scheme 10, a general preparatory synthesis for BODIPY-containing compounds of the invention is presented.

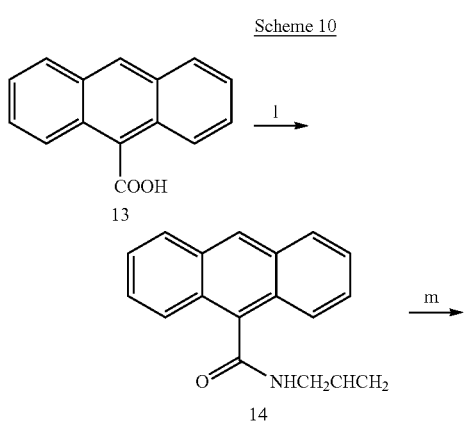

Scheme 10

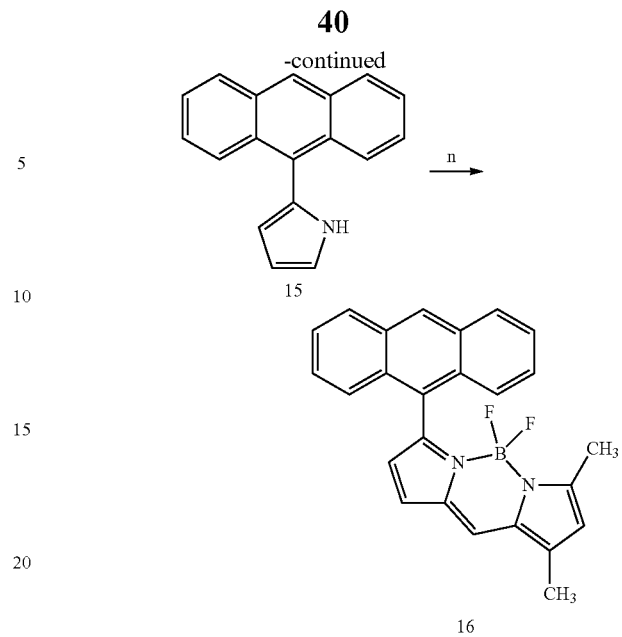

Anthracene-9carboxylic acid 13 is reacted with oxalyl chloride, and then allylic amine in dry DMF/$CH_2Cl_2$ in order to produce 14 (reaction l). 14 is reacted with phosgene and then reacted under basic conditions to produce 15 (reaction m). 15 is then reacted with 3,5 dimethylpyrrole-2-carboxaldehyde and phosphorus oxychloride in dry $CH_2Cl_2$. Diisopropyl ethyl amine and boron-trifluoride diethyl ether complex are then added in order to produce 16 (reaction n).

Methods of Use

The present invention also provides methods of using the compounds described herein for a wide variety of chemical, biological and biochemical applications.

Thus, in another aspect, the present invention provides a method for determining the presence of singlet oxygen in a sample. The method includes contacting the sample with a compound of the invention that is not already oxidized. The singlet oxygen is allowed to react with the compound of the invention to form a fluorescent product. In an exemplary embodiment, the method further comprises illuminating the fluorescent product with an appropriate wavelength so that the presence of the singlet oxygen is determined in the sample.

Thus in an exemplary embodiment, the present method for detecting the presence or absence of singlet oxygen in a sample comprises:

a) contacting the sample with a present fluorogenic compound to prepare a labeled sample;
b) incubating the labeled sample for a sufficient amount of time to prepare an incubated sample, wherein the singlet oxygen reacts with the fluorogenic compound to produce a fluorescent product;
c) illuminating the incubated sample with an appropriate wavelength to prepare an illuminated sample; and
d) observing the illuminated sample whereby the presence or absence of the singlet oxygen in the sample is determined.

Compounds of the invention containing a reactive group or a carrier molecule are discussed in detail above and are equally applicable to the methods discussed herein.

In another exemplary embodiment, the present invention provides a method of detecting singlet oxygen in a sample by using an immobilized compound of the invention. The method includes combining the sample with a compound of the invention covalently bonded to a solid support. The singlet oxygen in the sample is then allowed to react with the compound of the invention to form a fluorescent product. In another exemplary embodiment, the method further comprises illuminating the fluorescent product with an appropriate wavelength so that the presence of the singlet oxygen is determined in the sample.

In methods of detecting singlet oxygen by using an immobilized compound of the invention, the methods may further include, after forming the fluorescent product, rinsing the solid support to remove components of the sample other than the immobilized fluorescent product. In another exemplary embodiment, the methods may further provide, after forming the immobilized fluorescent product, detecting the immobilized fluorescent product. In a related embodiment, the immobilized fluorescent product is detected after rinsing the solid support. In another exemplary embodiment, the method may further provide, after forming the immobilized fluorescent product, releasing the singlet oxygen in the immobilized fluorescent product with a reducing agent.

Solid supports covalently bonded to a compound of the invention are discussed in detail above and are equally applicable to the methods discussed herein. Likewise, carrier molecules covalently bonded to a compound of the invention are discussed in detail above and are equally applicable to the methods discussed herein.

Rinsing the solid support typically functions to remove residual, excess or unbound materials from the solid support other than the immobilized fluorescent product. Any appropriate solution or series or solutions may be used to rinse the solid support. Exemplary solvents useful in the present invention include both polar and non-polar solvents. Thus, any appropriate organic solvent or aqueous solution is useful in the methods of the current invention.

Solutions of the compounds of the invention are prepared according to methods generally known in the art. The compounds of the invention are generally soluble in water and aqueous solutions having a pH less than or equal to about 6. Stock solutions of pure compounds of the invention, however, may be dissolved in organic solvent before diluting into aqueous solution or buffer. Exemplary organic solvents are aprotic polar solvents such as DMSO, DMF, N-methylpyrrolidone, acetone, acetonitrile, dioxane, tetrahydrofuran and other non-hydroxylic, completely water-miscible solvents. In general, the amount of compounds of the invention in solution is the minimum amount required to yield detectable singlet oxygen presence within a reasonable time, with minimal background signal. The exact concentration of compound of the invention to be used is dependent upon the experimental conditions and the desired results, and optimization of experimental conditions is typically required to determine the best concentration to be used in a given application. The concentration typically ranges from nanomolar to micromolar. The required concentration is determined by systematic variation in compound concentration until satisfactory results are accomplished. The starting ranges are readily determined from methods known in the art for use of similar compounds under comparable conditions for the desired response.

For those compounds of the present invention that are substituted by lipophilic moieties, the compounds of the invention are optionally introduced into living cells by passive permeation through the cellular membranes. Less cell-permeant embodiments of the invention are optionally introduced into cells by pressure microinjection methods, scrape loading techniques (short mechanical disruption of the plasma membrane where the plasma membrane is peeled away from the cytoplasm, the compound is perfused through the sample and the plasma membrane is reassembled), patch clamp methods (where an opening is maintained in the plasma membrane for long periods) or phagocytosis. Any other treatment that will permeabilize the plasma membrane, such as electroporation, shock treatments or high extracellular ATP can be used to introduce the compounds into the cellular cytoplasm.

Any suitable method of detection is useful in detecting fluorogenic or fluorescent compounds of the invention. In an exemplary embodiment, detection is achieved by illuminating the fluorogenic or fluorescent compounds at a wavelength selected to elicit a detectable optical response.

A detectable optical response means a change in, or occurrence of, a parameter in a test system that is capable of being perceived, either by direct observation or instrumentally. Typically the detectable response is a change in fluorescence, such as a change in the intensity, excitation or emission wavelength distribution of fluorescence, fluorescence lifetime, fluorescence polarization, or a combination thereof. The detectable optical response may occur throughout the sample or in a localized portion of the sample. The presence or absence of the optical response after the elapsed time is indicative of one or more characteristic of the sample. Comparison of the amount of the compound of the invention with a standard or expected response can be used to determine whether and to what degree a sample possesses singlet oxygen.

The compounds of the invention are useful as coloring agents, tracers for detecting the flow of fluids such as in angiography, and tracing of fluid flow through gap junctions of neurons according to procedures known in the art for other dyes. The compounds of the invention are also useful in assays as haptens, according to known methods.

In another aspect of the invention, the dye solution comprises a chemically reactive dye that is used to chemically attach the dye to the corresponding functional group on any of a wide variety of materials, such as cells, tissues, proteins, antibodies, enzymes, drugs, hormones, lipids, nucleotides, nucleic acids, or natural or synthetic polymers.

The compounds of the invention are also of use in numerous fluorescence polarization assays.

In those embodiments in which a compound of the invention is covalently bound to a carrier molecule that is a chelator of calcium, sodium, magnesium, potassium, or other biologically important metal ion, the amount of the compound that fluoresces functions as an indicator of the ion, which indicators are optionally further conjugated to a biological or plastic polymer according to methods known in the art; e.g., using fluorinated analogs of the compounds described in U.S. Pat. Nos. 5,453,517 and 5,405,975. Alternatively, the compound of the invention acts as a pH indicator at pH values within about 1.5 pH units of the individual dye's pKa. Typically the detectable optical response of the ion indicators is a change in fluorescence of the ion chelator.

Illumination

The sample and/or fluorogenic compounds are illuminated with a wavelength of light selected to give a detectable optical response, and observed with a means for detecting the optical response. Equipment that is useful for illuminating the present compounds and compositions of the invention includes, but is not limited to, hand-held ultraviolet lamps, mercury arc lamps, xenon lamps, lasers and laser diodes. These illumination sources are optically integrated into laser scanners, fluorescence microplate readers or standard or microfluorometers.

The compounds of the invention may, at any time after or during an assay, be illuminated with a wavelength of light that results in a detectable optical response, and observed with a means for detecting the optical response. Upon illumination, such as by an ultraviolet or visible wavelength emission lamp, an arc lamp, a laser, or even sunlight or ordinary room light, the fluorescent compounds, including those bound to the complementary specific binding pair member, display intense visible absorption as well as fluorescence emission. Selected equipment that is useful for illuminating the fluorescent compounds of the invention includes, but is not limited to, handheld ultraviolet lamps, mercury arc lamps, xenon lamps, argon lasers, laser diodes, and YAG lasers. These illumination sources are optionally integrated into laser scanners, fluorescence microplate readers, standard or mini fluorometers, or chromatographic detectors. This fluorescence emission is optionally detected by visual inspection, or by use of any of the following devices: CCD cameras, video cameras, photographic film, laser scanning devices, fluorometers, photodiodes, quantum counters, epifluorescence microscopes, scanning microscopes, flow cytometers, fluorescence microplate readers, or by means for amplifying the signal such as photomultiplier tubes. Where the sample is examined using a flow cytometer, a fluorescence microscope or a fluorometer, the instrument is optionally used to distinguish and discriminate between the fluorescent compounds of the invention and a second fluorophore with detectably different optical properties, typically by distinguishing the fluorescence response of the fluorescent compounds of the invention from that of the second fluorophore. Where a sample is examined using a flow cytometer, examination of the sample optionally includes isolation of particles within the sample based on the fluorescence response by using a sorting device.

Sample Preparation

The end user will determine the choice of the sample and the way in which the sample is prepared. The sample includes, without limitation, any biological derived material that is thought to contain singlet oxygen. Alternatively, samples also include material in which singlet oxygen has been added to determine the effect that singlet oxygen has on predetermined biological parameters. In another aspect of the invention, the sample can also include a buffer solution that contains any of the quencher compositions of the present invention to determine the ability of the carbocyanine compounds to quench the donor signal or the ability to reduce the residual energy from the donor molecule in the absence of a fluorogenic compound of the invention.

The sample can be a biological fluid such as whole blood, plasma, serum, nasal secretions, sputum, saliva, urine, sweat, transdermal exudates, cerebrospinal fluid, or the like. Biological fluids also include tissue and cell culture medium wherein an analyte of interest has been secreted into the medium. Alternatively, the sample may be whole organs, tissue or cells from the animal. Examples of sources of such samples include muscle, eye, skin, gonads, lymph nodes, heart, brain, lung, liver, kidney, spleen, thymus, pancreas, solid tumors, macrophages, mammary glands, mesothelium, and the like. Cells include without limitation prokaryotic cells and eukaryotic cells that include primary cultures and immortalized cell lines. Eukaryotic cells include without limitation ovary cells, epithelial cells, circulating immune cells, β cells, hepatocytes, and neurons.

In many instances, it may be advantageous to add a small amount of a non-ionic detergent to the sample. Generally the detergent will be present in from about 0.01 to 0.1 vol. %. Illustrative non-ionic detergents include the polyoxyalkylene diols, e.g. Pluronics, Tweens, Triton X-100, etc.

In fluorescence experiments, the reaction is optionally quenched. Various quenching agents may be used, both physical and chemical. Conveniently, a small amount of a water-soluble solvent may be added, such as acetonitrile, DMSO, SDS, methanol, DMF, etc.

Singlet Oxygen Generation

In an exemplary embodiment, the methods of the invention further comprise producing singlet oxygen through a generation system. In an exemplary embodiment, the singlet oxygen is generated from a reaction which is a member selected from a photosensitizer and ground state oxygen in the presence of visible light (such as chlorophyl, hematoporphyin, Rose Bengal, eosin and the like, as described by A. Nickon and W. L. Mendelson, J. Am. Chem. Soc. 87: 3921 (1965) and K. Gollnick and G. O, Schenk, Pure and Applied Chem., 9:507 (1964), or as described in U.S. Pat. No. 3,281,415); hypochlorites and hydrogen peroxide (C. S. Foote and S. Wexler, J. Am. Chem. Soc. 86:3879 and 3881 (1964), and in U.S. Pat. No. 3,274,181); benzyl cyanide and hydrogen peroxide (E. McKeown and W. A. Waters, Nature, 203:1063 (1964)); oxalyl chloride and hydrogen peroxide (E. A. Chandross, Tetrahedron Letters, 12:761 (1963)), sodium molybdate and hydrogen peroxide; ozone and phosphines (Q. E. Thompson, J. Am. Chem. Soc. 83:845 (1961)); ozone and phosphites (Q. E. Thompson, J. Am. Chem. Soc. 83:845 (1961)); electrodeless discharge of ground state oxygen (E. J. Corey and W. C. Taylor, J. Am. Chem. Soc. 86:3881 (1964)); hydrogen peroxide in an aqueous solution with Fe (II), (III), or Ce (IV) ions (Stauff and Lohman, Z. Physikal Chem., N. F., 40:123 (1964)); and pyrolysis of aromatic endoperoxides. In another exemplary embodiment, singlet oxygen is a product formed by the reaction of a photosensitizer and ground state oxygen in the presence of visible light. In another exemplary embodiment, the photosensitizer is a member selected from aromatic carbonyl compounds, condensed aromatic compounds, acridine dyes, coumarin dyes, crystal violet, fluorene derivatives, naphthalocyanines, porphyrin derivatives, chlorins, phthalocyanines, thiazine dyes, thioketones, xanthene dyes, platinum (II) terpyridyl acetylide complex, and combinations thereof. In another exemplary embodiment, the photosensitizer is a member selected from acetonapthone, acetophenone, benzophenone, acridine orange, eosin, fluorene, fluorenone, fluorescein, methylene blue, naphthalocyanines, phthalocyanine, rose bengal, 5,10,15,20-tetrakis(m-hydroxyphenyl) chlorin, thiocoumarin, toluidine blue, methylene blue, zinc tetraphenylporphyrin tetrasulfonate, and combinations thereof. In another embodiment, the photosensitizer is methylene blue. In yet another exemplary embodiment, singlet oxygen is a product formed by the reaction of sodium molybdate and hydrogen peroxide.

Light is required for the photochemical generation of singlet oxygen. A variety of light sources can be employed. The light source is preferably sunlight or room light such as incandescent or fluorescent light. Coherent or narrow spectrum sources such as lasers and light emitting diodes, flash tubes, arc lamps, mercury vapor lamps, sodium lamps and other sources that will be familiar to those skilled in the art can also be employed, so long as the chosen light source provides the desired degree of singlet oxygen generation and safety under the desired conditions of use. Preferably the light source provides both UV and visible energy. For many applications, the light from a typical 60 W to 100 W incandescent bulb, placed within a few centimeters of the desired target area, will provide sufficient illumination. The intensity of illumination can vary within wide limits, depending in part on the type and concentration of sensitizer. The exposure time can also vary, with exposure times of a few minutes up to a few hours being preferred and exposure times of a few minutes to about one hour being more preferred. As those skilled in the art will appreciate, use of lower intensity illumination or a greater distance between the light source and the antimicrobial composition will typically require a longer exposure time.

Kits

In another aspect, the present invention provides kits that include compounds of the invention, and a reaction buffer. The kit will generally also include instructions for using the compound of the invention in one or more methods. In an exemplary embodiment, the kit further comprises a singlet oxygen generator as a positive control. In another exemplary embodiment, the singlet oxygen generator is a member selected from methylene blue/ground state oxygen/visible light, and sodium molybdate/hydrogen peroxide.

In another exemplary embodiment, the kit includes a solid support covalently bonded to a compound of the invention and instructions for immobilizing a target analyte in a sample to the solid support.

In another exemplary embodiment, the instructions further specify, after forming the immobilized target analyte, rinsing the solid support to remove components of the sample other than the immobilized target analyte. In another related embodiment, the instructions further specify, after forming the immobilized target analyte, detecting the immobilized target analyte. In another related embodiment, the instructions further specify, after forming the immobilized target analyte, releasing the immobilized target analyte with a reducing agent.

Methods of detecting immobilized target analytes and labeled target analytes are presented in detail above and are equally applicable to the kits of the present invention.

Those skilled in the art will appreciate that a wide variety of additional kits and kit components can be prepared according to the present invention, depending upon the intended user of the kit, and the particular needs of the user.

A detailed description of the invention having been provided above, the following examples are given for the purpose of illustrating the invention and shall not be construed as being a limitation on the scope of the invention or claims.

EXAMPLES

Example 1

Preparation of Compound 2

To a solution of 9-methylanthracene (10 g, 652 mmol) in CCl$_4$ (700 mL) was added a solution of Br$_2$ (3.2 mL, 782 mmol) in CCl$_4$ (200 mL) over a period of 7 hrs. The mixture was stirred at room temperature in the dark overnight and then poured into saturated NaHCO$_3$ solution (300 mL). The aqueous layer was extracted with CHCl$_3$ and the combined organic layers were dried with anhydrous Na$_2$SO$_4$. The solvent was removed in vacuo and the crude product was purified by column chromatography on silica gel using hexane as eluent to give 2 (3.54 g).

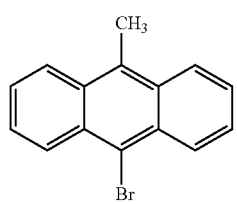

Compound 2

Example 2

Preparation Compound 3

To a solution of 2,4-dimethoxyphenylboronic acid (2.46 g, 13.5 mmol), 2 (1.83 g, 6.75 mmol) and tetrakis(triphenylphosphine)palladium (0.84 g, 0.68 mmol) in toluene (60 mL) and isopropanol (30 mL) was added a solution of K$_2$CO$_3$ (5.6 g, 40.5 mmol) in H$_2$O (10 mL). The mixture was bubbled with N$_2$ gas for 5 minutes and then heated to 105° C. under N$_2$ overnight. The mixture was poured into H$_2$O and extracted with ethyl acetate. The organic layer was dried with anhydrous Na$_2$SO$_4$ and the filtrate was removed in vacuo. The crude product was purified by column chromatography on silica gel using hexanes:EtOAc=5:1 as eluent to give 3 (3.26 g).

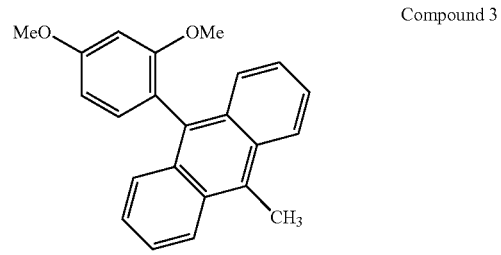

Compound 3

Example 3

Preparation of Compound 4

To a solution of 3 (3.26 g, 10 mmol) in CH$_2$Cl$_2$ at 0° C. was added a solution of BBr$_3$ (2.4 mL, 25 mmol) in CH$_2$Cl$_2$ (30 mL). The mixture was stirred at 0° C. for 2 hrs and poured into ice water. The aqueous layer was extracted with CHCl$_3$ and the combined organic layers were dried with anhydrous Na$_2$SO$_4$. The crude product was purified by column chromatography on silica gel using hexanes:EtOAc=5:1 to 2:1 as eluents to give 4 (2.81 g).

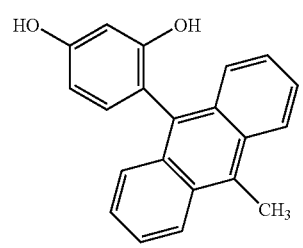

Compound 4

Example 4

Preparation of Compound 5

A mixture of 2,4-(and 2,5-)-dicarboxy-5'-chloro-2',4'-dihydroxybenzophenone (74 mg, 0.22 mL) and 4 (66 mg, 0.22 mmol) in methanesulfonic acid (5 mL) was heated at 85° C. in the dark under N$_2$ for 30 minutes. The mixture was poured into H$_2$O and extracted with EtOAc. The organic layer was washed with H$_2$O and dried with anhydrous Na$_2$SO$_4$. The filtrate was concentrated to dryness in vacuo and the crude residue was purified by column chromatography on silica gel using CHCl₃:MeOH=10:1 as luent to give 5 (55 mg).

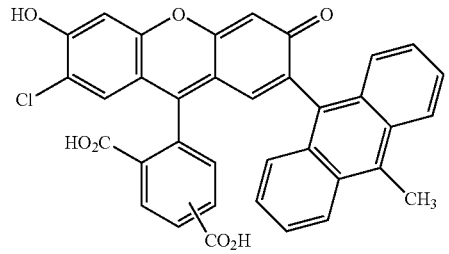

Compound 5

Example 5

Preparation of Compound 6

A mixture of 2,4-(and 2,5-)-dicarboxy-5'-fluoro-2',4'-dihydroxybenzophenone (35 mg, 0.109 mol) and 4 (51 mg, 0.128 mmol) in methanesulfonic acid (5 mL) was heated at 85° C. in the dark under $N_2$ for 30 minutes. The mixture was poured into $H_2O$ and extracted with EtOAc. The organic layer was washed with $H_2O$ and dried with anhydrous $Na_2SO_4$. The filtrate was concentrated to dryness in vacuo and the crude residue was purified by preparative TLC using CHCl₃: MeOH=10:1 as eluent to give 6 (30 mg).

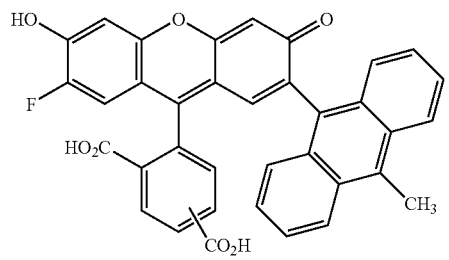

Compound 6

Example 6

Preparation of Compound 7

A mixture of 5 (1 g, 1.75 mmol), triethylamine (3 mL) and acetic anhydride (3 mL) in DMF (30 mL) was heated at 90° C. in the dark for 10 minutes. The mixture was concentrated to dryness in vacuo and the residue was partitioned between $H_2O$ and EtOAc. The organic layer was dried with anhydrous $Na_2SO_4$ and the filtrate was concentrated to dryness in vacuo. The residue was purified by column chromatography on silica gel using CHCl₃:MeOH:HOAc=600:20:1 as eluent to give 7 (1.65 g) with about 80% purity.

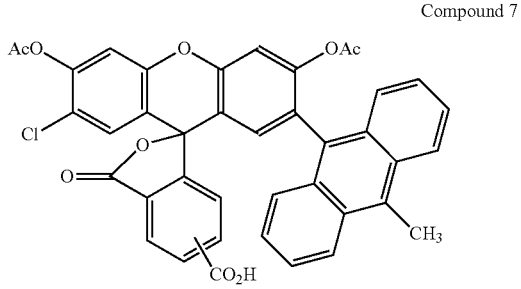

Compound 7

Example 7

Preparation of Compound 8

A mixture of 7 (1.65 g, 2.4 mmol), bromomethyl acetate (1.5 mL) and N,N-diisopropylethylamine (1.5 mL) in dry THF (60 mL) was stirred at room temperature in the dark for 6 hrs. The mixture was concentrated to dryness in vacuo and the residue was purified by column chromatography on silica gel using hexanes:CHCl₃:EtOAc=2:1:0.5 as eluent to give 8 (600 mg).

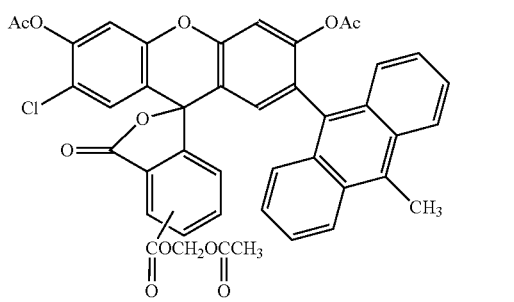

Compound 8

Example 8

Preparation of Compound 9

To a solution of 7 (67 mg, 0.1 mmol) in dry THF (5 mL) and dry pyridine (0.1 mL) was added succinimidyl trifluoroacetate (160 mg, 0.7 mmol). The mixture was stirred at room temperature for 3 hrs. The mixture was diluted with EtOAc and washed with $H_2O$, 2% HCl and saturated NaCl. The organic layer was concentrated to dryness in vacuo. The residue was dissolved in minimum amount of EtOAc and precipitation with hexanes to yield 9 (70 mg).

Compound 9

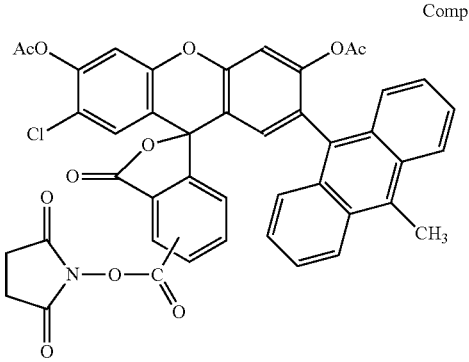

Compound 11

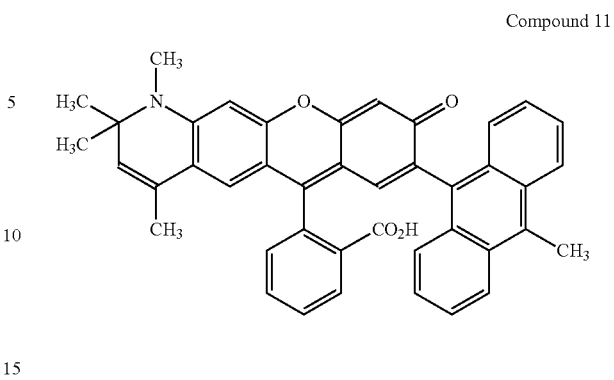

Example 9

Preparation of Compound 10

A mixture of 4 (95 mg, 0.32 mmol) and 4-nitrosoresocinol (44 mg, 0.32 mmol) in concentrated sulfuric acid (3 mL) was heated at 80° C. for 3 hrs. The mixture was poured into H₂O and extracted with EtOAc. The organic layer was washed with saturated NaCl and dried with anhydrous Na₂SO₄. The filtrate was concentrated to dryness in vacuo and the residue was purified by column chromatography on silica gel using CHCl₃:MeOH=10:0.1 as eluent to give 10 (15 mg).

Compound 10

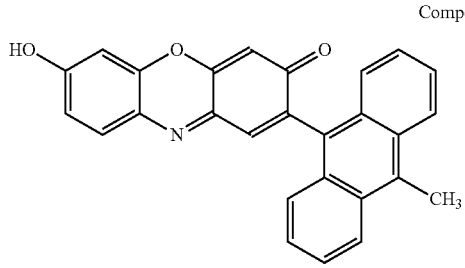

Example 10

Preparation of Compound 11

A mixture of 4 (81 mg, 0.27 mmol) and aminophenol (95 mg, 0.27 mmol) in methanesulfonic acid was heated at 80° C. for 30 minutes. The mixture was poured into H₂O and extracted with CHCl₃. The organic layer was washed with saturated NaCl and dried with anhydrous Na₂SO₄. The filtrate was concentrated to dryness in vacuo and the residue was purified by column chromatography on silica gel using CHCl₃:MeOH=10:0.2 as eluent to give 11 (30 mg).

Example 11

Preparation of Compound 12

A mixture of 4 (50 mg, 0.17 mmol) and ethyl acetoacetate (26 mg, 0.2 mmol) in methanesulfonic acid (3 mL) was heated at 80° C. for 30 minutes. The reaction mixture was poured into H₂O and extracted with EtOAc. The organic layer was washed with saturated NaCl and dried with anhydrous Na₂SO₄. The crude product was purified by column chromatography on silica gel using hexanes:EtOAc=5:1 as eluent to give 12 (35 mg).

Compound 12

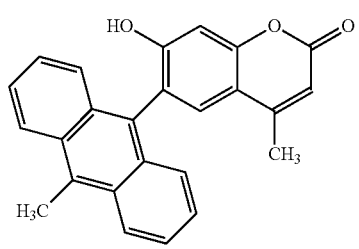

Example 12

Preparation of Compound 14

A 500 mL round bottom flask was charged with dry DMF (200 mL)/dry methylene chloride (50 mL) and cooled to ~0° C. 9-Anthracene carboxylic acid (25 g, 112.5 mmol) was dissolved in the cooled solution under nitrogen to give a clear, amber solution. While maintaining 0° C., oxalyl chloride (10.4 mL, 119.2 mmol) was added over 30 minutes via syringe. The solution was then allowed to warm to room temperature and stirred for 20 minutes. The solvents were removed in vacuo to a thick yellow semi-solid, which were redissolved in dry methylene chloride (150 mL) under nitrogen. Separately, allyl amine (21 mL, 280 mmol) was dissolved in 100 mL dry methylene chloride (100 mL) under nitrogen, cooled to 0° C. and stirred for 15 minutes. The anthracene acid chloride solution was added to the allyl amine at 0° C. under nitrogen. The combined solution was stirred at 0° C. for 30 minutes. The solution was carefully added to 1M HCl (150 mL) and stirred overnight. The biphasic mixture was partitioned and the aqueous portion was discarded. The organic portion was placed in a freezer to crystallize. The resultant crystals were collected by vacuum filtration and dried under vacuum for 48 hrs to give 14 (17.35 g)

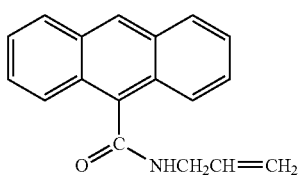

Compound 14

Example 13

Preparation of Compound 15

In a 250 mL round bottom flask, 14 (2.0 g, 7.64 mmol) was suspended in dry methylene chloride (75 mL) under $N_2$ at 0° C. To the suspension, 20% phosgene (42 mL, 79.4 mmol) in toluene was added. The combined suspension was allowed to warm to room temperature and stirred overnight. All suspended materials had dissolved to produce a clear yellow solution. The solvent was removed in vacuo and the resultant residue was dissolved in 100 mL dry THF. Separately, potassium t-butoxide (2.3 g 20.5 mmol) was suspended in dry DMF (100 mL) at 0° C. under $N_2$. The suspension was stirred for 30 minutes and nearly all suspended materials dissolved. The THF-anthracene solution was added to the butoxide via syringe at 0° C. The resultant dark red solution was stirred for 30 min. The THF was removed in vacuo and water (150 mL) added. The mixture was extracted with ethyl acetate (2×50 mL). The combined extracts were washed with brine, dried over sodium sulfate, filtered and dried to an oil. The oil was purified by silica gel chromatography on silica gel (1:4 EtOAc/Hexanes) to yield 15 (532 mg).

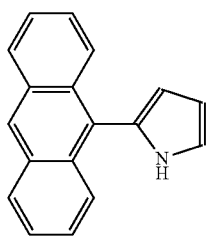

Compound 15

Example 14

Preparation of Compound 16

In a 100 mL round bottom flask at 0° C. under $N_2$, 2-(9-anthracenyl)pyrrole (462 mg, 1.9 mmol) and 3,5-dimethylpyrrole-2-carboxaldehyde (231 mg, 1.9 mmol) were dissolved in dry methylene chloride (30 mL). Phosphorus oxychloride (0.18 mL, 1.9 mmol) was added dropwise and the resultant solution stirred at 0° C. under $N_2$ for 2 hours. Diisopropyl ethylamine (1.4 mL, 7.6 mmol) and boron trifluoride diethyl ether complex (1.4 mL, 7.6 mmol) were added. The resultant solution was allowed to warm to room temperature and stirred for 2 hrs. The solution was poured into pH 4.2 phosphate buffer solution (100 mL) and extracted with methylene chloride (2×50 mL). The combined organics were washed with brine, dried over sodium sulfate, filtered and dried to a reddish-brown solid. The solid was purified by silica gel chromatography on silica gel (2:1 Hexanes/methylene chloride) to yield 16 (50 mg).

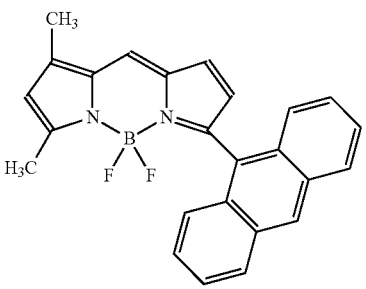

Compound 16

Example 15

Detection of Singlet Oxygen Generated Via Molybdate-Catalyzed Disproportionation of Hydrogen Peroxide Stock solutions of sodium molybdate (200 mM) and 40 µM dye Compound 5 or 6 were prepared in 100 mM phosphate buffer, pH 10). Working solutions containing 2 mL of 1 µM dye and 20 mM $H_2O_2$ in the same buffer were prepared in a 10 mm×10 mm fluorescence cuvette. The sample was placed in a Hitachi F-4500 spectrofluorometer and magnetic stirring was applied. Fluorescence measurements were made for periods of 20 seconds with 240 second (4 minute) intervals between each measurement. Fluorescence excitation and emission wavelength settings were 488 nm and 525 nm respectively. After the first measurement period, 1 mM $NaMoO_4$ was added to the sample. Under these conditions, 1O2 is generated via molybdate catalyzed disproportionation of $H_2O_2$ (J. M. Aubry, B. Cazin and F. Duprat; Chemical sources of singlet oxygen. 3. Peroxidation of water-soluble singlet oxygen carriers with the hydrogen peroxide-molybdate system, J. Org. Chem. 54:726-728 (1989)). At each time point, the average fluorescence intensity over the 20-second measurement period was divided by the corresponding value for the first measurement period (before addition of $NaMoO_4$). This ratio ($F/F_0$) is plotted as a function of time in FIG. 1.

Corresponding time-dependent increases of fluorescence intensity for control samples with no addition of $NaMoO_4$ were minimal.

Example 16

Detection of Singlet Oxygen Generated Via Methylene Blue Photosensitization

Working solutions containing 1 µM dye Compound 5 and 10 µM methylene blue in 1 mL of 100 mM Tris buffer (pH 7.5) diluted with 1 mL $H_2O$ were prepared in a 10 mm×10 mm fluorescence cuvette. The sample was placed in a Hitachi F-4500 spectrofluorometer and magnetic stirring was applied. Fluorescence excitation and emission wavelength settings were 488 nm and 525 nm respectively. Fluorescence measurements were made for periods of 20 seconds with 30-second intervals between each measurement. During these 30-second intervals, the sample was exposed to laser radiation (630-680 nm, <5 mW), resulting in methylene blue-photosensitized generation of singlet oxygen ($^1O_2$). The resulting fluorescence intensity versus time trace is labeled "pH 7.5" in FIG. 2. The experiment was repeated using a sample to which the $^1O_2$ scavenger sodium azide (1 mM) had been added (trace labeled "NaN$_3$" in FIG. 2). A third experiment was run in which 50% of the H$_2$O content of the sample was replaced by D$_2$O (trace labeled "50% D$_2$O" in FIG. 2). D$_2$O has the effect of increasing the lifetime of 102. No irradiation-dependent increase of fluorescence intensity was observed for a control sample without methylene blue subjected to the same periodic laser exposure sequence.

Example 17

Dependence of Fluorescence Emission Spectra on Solvent

Solutions of Compound 5 (1 μM) were prepared in dimethylsulfoxide (DMSO), methanol (MeOH) and aqueous buffer (50 mM Tris pH 7.5). 2 mL portions of these solutions were transferred to 10 mm×10 mm quartz cuvettes and fluorescence emission spectra were recorded on a Hitachi F-4500 spectrofluorometer using identical instrument detection sensitivity settings. Excitation was at 488 nm in all cases. For the DMSO and MeOH solutions, the spectra were re-scanned after addition of a small amount of 0.1 M NaOH to the 2 mL solution sample. Results are plotted in FIG. 3A and FIG. 3B. FIG. 3B represents an approximately 10-fold enlargement on the y-axis of FIG. 3A. This presentation of the data is necessitated by the extremely weak fluorescence of the dye in MeOH and aqueous buffer relative to that in DMSO.

Example 18

Fluorescence Enhancement Upon Binding to Proteins

A solution of Compound 5 (1 μM) was prepared in phosphate-buffered saline (PBS) (50 mM phosphate buffer, pH 7.4, 150 mM NaCl). A 2 mL portion of this solution was transferred to a 10 mm×10 mm quartz cuvette. The fluorescence emission spectrum of the solution was recorded on a Hitachi F-4500 spectrofluorometer using excitation at 488 nm. 1 μL of a 4.5 mM solution of bovine serum albumin (30% (w/v) BSA (Sigma Chemical Co., St. Louis, Mo., catalog number A-7284)) was then added to the 2 mL of aqueous dye solution. The emission scan measurement was then repeated. Further measurements were made as the amount of added BSA was increased up to 4.5 μM. The observed increases in fluorescence intensity as a function of BSA concentration are plotted in FIG. 4.

Example 19

Fluorescence Emission in DMSO/Water Mixtures

A solution of Compound 5 (1 μM) was prepared in dimethylsulfoxide (DMSO). A 2 mL portion of this solution was transferred to a 10 mm×10 mm quartz cuvette. The fluorescence emission spectrum of the solution was recorded on a Hitachi F-4500 spectrofluorometer using excitation at 488 nm. 2 μL of water was then mixed into the 2 mL of DMSO solution. The emission scan measurement was then repeated. Further measurements were made as the fraction of water in the solvent was increased up to 10% (v/v). Results are plotted in FIG. 5A and FIG. 5B. Fluorescence intensities shown in these figures are not corrected for the relatively small (maximum 10%) dilution of the sample resulting from the addition of water.

The preceding examples can be repeated with similar success by substituting the specifically described fluorogenic compounds of the preceding examples with those generically and specifically described in the forgoing description. One skilled in the art can easily ascertain the essential characteristics of the present invention, and without departing from the spirit and scope thereof, can make various changes and modifications of the invention to adapt to various usages and conditions.

All patents and patent applications mentioned in this specification are herein incorporated by reference to the same extent as if each individual patent or patent application was specifically and individually indicated to be incorporated by reference.

What is claimed is:

1. A fluorogenic compound, where the compound is:

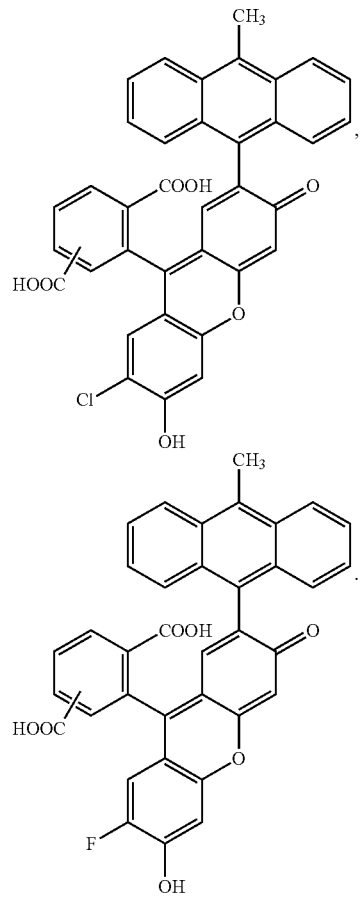

2. A method for the determination of the presence or absence of singlet oxygen in a sample, wherein the method comprises:
a) contacting the sample with a fluorogenic compound according to claim 1 to prepare a labeled sample;
b) incubating the labeled sample for a sufficient amount of time to prepare an incubated sample, wherein the singlet oxygen reacts with the fluorogenic compound to produce a fluorescent product;
c) illuminating the incubated sample with an appropriate wavelength to prepare an illuminated sample; and d) observing the illuminated sample whereby the presence or absence of the singlet oxygen in the sample is determined.

3. The method according to claim 2, wherein the singlet oxygen is a product formed by a photosensitizer and ground state oxygen in the presence of visible light, hypochlorites and hydrogen peroxide, benzyl cyanide and hydrogen peroxide, oxalyl chloride and hydrogen peroxide, sodium molybdate and hydrogen peroxide, ozone and phosphines, ozone and phosphites, electrodeless discharge of ground state oxygen, hydrogen peroxide in an aqueous solution with Fe (II), (III), or Ce (IV) ions, or pyrolysis of aromatic endoperoxides.

4. The method according to claim 2, wherein the singlet oxygen is a product formed by the reaction of a photosensitizer and ground state oxygen in the presence of visible light.

5. The method according to claim 3, wherein the photosensitizer is an aromatic carbonyl compound, condensed aromatic compound, acridine dye, coumarin dye, crystal violet, fluorene derivative, naphthalocyanine, porphyrin derivative, chlorin, phthalocyanine, thiazine dye, thioketone, xanthene dye, platinum (II) terpyridyl acetylide complex, or combinations thereof.

6. The method according to claim 3, wherein the photosensitizer is an acetonapthone, acetophenone, benzophenone, acridine orange, eosin, fluorene, fluorenone, fluorescein, methylene blue, naphthalocyanine, phthalocyanine, rose bengal, 5,10,15,20-tetrakis(m-hydroxyphenyl)chlorin, thiocoumarin, toluidine blue, methylene blue, zinc tetraphenylporphyrin tetrasulfonate, or combinations thereof.

7. The method according to claim 3, wherein the photosensitizer is methylene blue.

8. The method according to claim 2, wherein the singlet oxygen is a product formed by the reaction of sodium molybdate and hydrogen peroxide.

9. A kit for the determination of singlet oxygen in a sample, wherein the kit comprises:
   a) a reaction buffer; and,
   b) a fluorogenic compound according to claim 1.

10. The kit according to claim 9, further comprising instructions for use of the kit.

11. The kit according to claim 9, further comprising a singlet oxygen generator.

12. The kit according to claim 9, further comprising methylene blue, sodium molybdate or hydrogen peroxide.

13. A composition comprising:
   a) a sample; and
   b) a fluorogenic compound according to claim 1.

14. The composition according to claim 13, further comprising a singlet oxygen generator in an amount sufficient to produce singlet oxygen.

15. The composition according to claim 13, further comprising methylene blue, sodium molybdate or hydrogen peroxide.

* * * * *